United States Patent
McNeff et al.

(10) Patent No.: US 7,897,798 B2
(45) Date of Patent: Mar. 1, 2011

(54) METHODS AND APPARATUS FOR PRODUCING ALKYL ESTERS FROM LIPID FEED STOCKS AND SYSTEMS INCLUDING SAME

(75) Inventors: Clayton V. McNeff, Andover, MN (US); Larry C. McNeff, Anoka, MN (US); Arlin E. Gyberg, Minneapolis, MN (US); Bingwen Yan, Shoreview, MN (US); Daniel Thomas Nowlan, Hugo, MN (US); Brian Krohn, Cloquet, MN (US)

(73) Assignee: McNeff Research Consultants, Inc., Anoka, MN (US)

( * ) Notice: Subject to any disclaimer, the term of this patent is extended or adjusted under 35 U.S.C. 154(b) by 0 days.

(21) Appl. No.: 11/833,839

(22) Filed: Aug. 3, 2007

(65) Prior Publication Data

US 2008/0051592 A1    Feb. 28, 2008

Related U.S. Application Data

(60) Provisional application No. 60/821,498, filed on Aug. 4, 2006, provisional application No. 60/825,575, filed on Sep. 13, 2006, provisional application No. 60/889,730, filed on Feb. 13, 2007.

(51) Int. Cl.
    *C11C 3/00* (2006.01)
(52) U.S. Cl. .................................................. 554/170
(58) Field of Classification Search ............ 554/170
    See application file for complete search history.

(56) References Cited

U.S. PATENT DOCUMENTS

| 2,383,632 | A |   | 8/1945  | Trent              |
|-----------|---|---|---------|--------------------|
| 2,679,471 | A | * | 5/1954  | Ayers et al. ........ 562/511 |
| 3,383,396 | A |   | 5/1968  | Cahn et al.        |
| 4,138,336 | A |   | 2/1979  | Mendel et al.      |
| 4,216,337 | A |   | 8/1980  | Baba et al.        |
| 4,487,933 | A |   | 12/1984 | Mixan et al.       |
| 4,582,589 | A |   | 4/1986  | Ushizawa et al.    |
| 4,716,218 | A |   | 12/1987 | Chen et al.        |
| 4,861,739 | A |   | 8/1989  | Pellet et al.      |

(Continued)

FOREIGN PATENT DOCUMENTS

| BR | 8202429 | 11/1983 |
|----|---------|---------|
| CN | 1680514 | 10/2005 |
| CN | 1718679 | 1/2006  |
| CN | 1858160 | 11/2006 |

(Continued)

OTHER PUBLICATIONS

Bournay, L. et al., "New Heterogeneous Process for Biodiesel Production: A Way to Improve the Quality and the Value of the Crude Glycerin Produced by Biodiesel Plants", Catalysis Today 2005, 106:190-192.*

(Continued)

*Primary Examiner* — Deborah D Carr
(74) *Attorney, Agent, or Firm* — Pauly, DeVries Smith & Deffner, L.L.C.

(57) ABSTRACT

The present invention relates to methods and apparatus for producing alkyl esters from lipid feed stocks, such as plant oils and/or animal fats, and systems including the same. In an embodiment, the invention includes a process for producing alkyl esters including mixing a lipid feed stock with an alcohol to form a reaction mixture; and contacting the reaction mixture with a catalyst under supercritical conditions for the alcohol, the catalyst comprising an unmodified metal oxide selected from the group consisting of alumina, titania, zirconia, and hafnia, and removing residual free fatty acids from the reaction mixture. Other embodiments are included herein.

24 Claims, 10 Drawing Sheets

U.S. PATENT DOCUMENTS

| | | |
|---|---|---|
| 5,108,597 A | 4/1992 | Funkenbusch et al. |
| 5,182,016 A | 1/1993 | Funkenbusch et al. |
| 5,254,262 A | 10/1993 | Funkenbusch et al. |
| 5,271,833 A | 12/1993 | Funkenbusch et al. |
| 5,298,650 A | 3/1994 | Walter et al. |
| 5,321,197 A | 6/1994 | Angstadt et al. |
| 5,346,619 A | 9/1994 | Funkenbusch et al. |
| 5,350,879 A | 9/1994 | Engel et al. |
| 5,508,457 A | 4/1996 | Bayense et al. |
| 5,532,392 A | 7/1996 | Gheorghiu |
| 5,540,834 A | 7/1996 | Carr et al. |
| 5,908,946 A | 6/1999 | Stern et al. |
| 6,090,959 A | 7/2000 | Hirano et al. |
| 6,211,390 B1 | 4/2001 | Peter et al. |
| 6,376,701 B1 | 4/2002 | Chavan et al. |
| 6,392,062 B1 | 5/2002 | Haas |
| 6,433,146 B1 | 8/2002 | Cheryan |
| 6,489,496 B2 | 12/2002 | Barnhorst et al. |
| 6,538,146 B2 | 3/2003 | Turck |
| 6,666,074 B2 | 12/2003 | Gerner et al. |
| 6,712,867 B1 | 3/2004 | Boocock |
| 6,719,815 B2 | 4/2004 | Nanninga et al. |
| 6,768,015 B1 | 7/2004 | Luxem et al. |
| 6,878,837 B2 | 4/2005 | Bournay et al. |
| 6,887,283 B1 | 5/2005 | Ginosar et al. |
| 6,960,672 B2 | 11/2005 | Nakayama et al. |
| 6,963,004 B2 | 11/2005 | Ahtchi-Ali et al. |
| 6,965,044 B1 | 11/2005 | Hammond et al. |
| 6,979,426 B2 | 12/2005 | Teall et al. |
| 6,982,340 B2 | 1/2006 | Mumura et al. |
| 7,045,100 B2 | 5/2006 | Ergun et al. |
| 7,112,688 B1 | 9/2006 | Tysinger et al. |
| 7,145,026 B2 | 12/2006 | Fleisher |
| 7,151,187 B2 | 12/2006 | Delfort et al. |
| 7,211,681 B2 | 5/2007 | Furuta |
| 7,321,052 B2 | 1/2008 | Miller et al. |
| 7,498,454 B2 | 3/2009 | Relingshoefer |
| 7,563,915 B2 | 7/2009 | Matson |
| 7,582,784 B2 | 9/2009 | BanaVali |
| 7,601,858 B2 | 10/2009 | Cantrell et al. |
| 7,790,651 B2 | 9/2010 | Lin et al. |
| 2002/0010359 A1 | 1/2002 | Kaita et al. |
| 2002/0156305 A1 | 10/2002 | Turck |
| 2003/0229238 A1 | 12/2003 | Fleisher |
| 2004/0074760 A1 | 4/2004 | Portnoff et al. |
| 2004/0087809 A1 | 5/2004 | Nakayama et al. |
| 2005/0064577 A1 | 3/2005 | Berzin |
| 2005/0080280 A1 | 4/2005 | Yoo |
| 2005/0118409 A1 | 6/2005 | McNeff et al. |
| 2005/0137411 A1 | 6/2005 | Ahtchi-Ali et al. |
| 2005/0204612 A1 | 9/2005 | Connemann et al. |
| 2005/0239182 A1 | 10/2005 | Berzin |
| 2005/0260553 A1 | 11/2005 | Berzin |
| 2005/0261509 A1 | 11/2005 | Delfort et al. |
| 2005/0266139 A1 | 12/2005 | Lacome et al. |
| 2005/0274065 A1 | 12/2005 | Portnoff et al. |
| 2006/0014974 A1 | 1/2006 | Bournay et al. |
| 2006/0041152 A1 | 2/2006 | Cantrell et al. |
| 2006/0041153 A1 | 2/2006 | Cantrell et al. |
| 2006/0080891 A1 | 4/2006 | Ghosh et al. |
| 2006/0149087 A1 * | 7/2006 | Furuta ........................... 554/174 |
| 2006/0224005 A1 | 10/2006 | Felly |
| 2006/0252950 A1 | 11/2006 | Ginosar et al. |
| 2006/0260186 A1 | 11/2006 | Iversen et al. |
| 2006/0288636 A1 | 12/2006 | Iijima et al. |
| 2007/0010682 A1 | 1/2007 | Myllyoja et al. |
| 2007/0027338 A1 | 2/2007 | Furuta |
| 2007/0037994 A1 | 2/2007 | Canos et al. |
| 2007/0066713 A1 | 3/2007 | Hillion et al. |
| 2007/0089356 A1 | 4/2007 | Krasutsky et al. |
| 2007/0093380 A1 | 4/2007 | Srinivas et al. |
| 2007/0196892 A1 | 8/2007 | Winsness et al. |
| 2008/0051592 A1 | 2/2008 | McNeff et al. |
| 2008/0161615 A1 | 7/2008 | Chapus |
| 2008/0188676 A1 | 8/2008 | Anderson et al. |
| 2008/0197052 A1 | 8/2008 | McNeff et al. |
| 2008/0318763 A1 | 12/2008 | Anderson |
| 2009/0029445 A1 | 1/2009 | Eckelberry et al. |
| 2010/0087670 A1 | 4/2010 | Wang et al. |

FOREIGN PATENT DOCUMENTS

| | | |
|---|---|---|
| CN | 1887417 | 1/2007 |
| CN | 1928016 | 3/2007 |
| DE | 102005038137 | 2/2007 |
| EP | 0198243 | 10/1986 |
| EP | 507217 | * 10/1992 |
| EP | 0507217 | 10/1992 |
| EP | 0535290 | 4/1993 |
| EP | 1505048 | 2/2005 |
| EP | 1580255 | 9/2005 |
| EP | 1 607 467 | 12/2005 |
| EP | 1681281 | 7/2006 |
| FR | 2188612 | 1/1974 |
| FR | 2679471 A1 * | 1/1993 |
| FR | 2890656 | 3/2007 |
| GB | 2132222 | 7/1984 |
| JP | 6313188 | 11/1994 |
| JP | 11228494 | 8/1999 |
| JP | 2005/126346 | 5/2005 |
| JP | 2005-177722 | 7/2005 |
| JP | 2005/177722 | 7/2005 |
| JP | 2007153943 | 6/2007 |
| JP | 2007190450 | 8/2007 |
| JP | 2008111085 | 5/2008 |
| WO | WO 00/05327 | 2/2000 |
| WO | WO-03/062358 | 7/2003 |
| WO | WO-03/087279 | 10/2003 |
| WO | WO-03/094598 | 11/2003 |
| WO | WO-2004/085585 | 10/2004 |
| WO | 2004096962 | 11/2004 |
| WO | WO-2005/000782 | 1/2005 |
| WO | WO 2005/021697 | 3/2005 |
| WO | WO-2005/021697 | 3/2005 |
| WO | WO-2005/035479 | 4/2005 |
| WO | WO-2005/093015 | 10/2005 |
| WO | WO-2005/123890 | 12/2005 |
| WO | WO-2006/081644 | 8/2006 |
| WO | WO-2006/088254 | 8/2006 |
| WO | WO-2006/093896 | 9/2006 |
| WO | WO-2006/094986 | 9/2006 |
| WO | WO-2007/011343 | 1/2007 |
| WO | WO-2007/012190 | 2/2007 |
| WO | WO-2007/025360 | 3/2007 |
| WO | WO-2007/029851 | 3/2007 |
| WO | WO-2007/038605 | 4/2007 |
| WO | WO-2007/043062 | 4/2007 |
| WO | 2007072972 | 6/2007 |
| WO | 2007077950 | 7/2007 |
| WO | WO-2006/070661 | 7/2007 |
| WO | 2007111604 | 10/2007 |
| WO | 2007140395 | 12/2007 |
| WO | 2007141293 | 12/2007 |
| WO | 2007142983 | 12/2007 |
| WO | 2008012275 | 1/2008 |
| WO | WO-2008019325 | 2/2008 |
| WO | 2008029132 | 3/2008 |
| WO | WO 2008/034109 | 3/2008 |
| WO | 2008041038 | 4/2008 |
| WO | WO-2008101032 | 8/2008 |

OTHER PUBLICATIONS

Raddi De Araujo, Lucia R. et al., "H3PO4/Al2O3 Catatysts: Characterization and Catalytic Evaluation of Oleic Acid Conversion to Biofuels and Biolubricant", Materials Research 2006, vol. 9, No. 2, 181-184.*

Unknown, "Beatrice Biodiesel Selects Axens Exterfip-H Technology", *Biodiesel Magazine* Jun. 2006.

BCC Research, "Global Market for Catalyst Regeneration", MarketResearch.com http://www.marketresearch.com/product/display.asp?productid=1354464 2006 , 1-20.

Blackwell, J. A. et al., "A Chromatographic Study of the Lewis Acid-Base Chemistry of Zirconia Surfaces", *J. Liquid Chromatog.* 1991, 14: 2875-2889.

Blackwell, J. A. et al., "Study of the Fluoride Adsorption Characterisitics of Porous Microparticulate Zirconium Oxide", *J. Chromatog.* 1991, 549: 43-57.

Bournay, L. et al., "New Heterogeneous Process for Biodiesel Production: A Way to Improve the Quality and the Value of the Crude Glycerin Produced by Biodiesel Plants", *Catalysis Today* 2005, 106: 190-192.

Brown, Adrian S. et al., "Sulfated Metal Oxide Catalysts: Superactivity through Superacidity?", *Green Chemistry* Feb. 1999, 17-20.

Cao, W. et al., "Preparation of Biodiesel from Soybean Oil Using Supercritical Methanol and Co-Solvent", *Fuel* 2005, 84:347-351.

Collins, K., "Statement of Keith Collins, Chief Economist, U.S. Department of Agriculture before the U.S. Senate Committee on Appropriations, Subcommittee on Agriculture, Rural Development, and Related Agencies: Economic Issues Related to Biofuels.", www.usda.gov/documents/Farmbill07energy.doc. Aug. 26, 2006, 1-8 (web).

Dean, Morgan et al., "Nanocrystalline Metal Oxide-Based Catalysts for Biodiesel Production from Soybean Oil", #96—*Student Poster Session: Catalysis & Reaction Engineering* (04016) http://aiche.confex.com/aiche/2006/techprogram/P78366.HTM Nov. 13, 2006, 1 (web).

Di Serio, et al., "Synthesis of Biodiesel via Homogeneous Lewis Acid Catalyst", *J. Molec. Catal. A Chem.* 2005, 239: 111-115.

Di Serio, M. et al., "Transesterification of Soybean Oil to Biodiesel by Using Heterogeneous Basic Catalysts", *Ind. Eng. Chem. Res.* 2006, 45: 3009-3014.

Dunlap, C. J. et al., "Zirconia Stationary Phases for Extreme Separations", *Anal. Chem.* 2001, 73: 598A-607A.

Furuta, S. et al., "Biodiesel Fuel Production with Solid Superacid Catalysis is Fixed Bed Reactor Under Atmospheric Pressure", *Catalysis Communications* 2004, 5: 721-723.

Gercel, H. F. et al., "Hydropyrolysis of Extracted *Euphorbia rigida* in a Well-Swept Fixed-Bed Tubular Reactor", *Energy Sources* 2002, 24: 423-430.

Goering, C. E. et al., "Fuel Properties of Eleven Vegetable Oils", *Trans ASAE* 1982, 25: 1472-1477.

Goodwin, J. G., "Research Activities: Biodiesel Synthesis", *Chemical and.Biomolecular Engineering at Clemson University*http://www.ces.clemson.edu/chemeng/facultypages/goodwin/research.html 2006, 1-5.

Haas, M. J., "Engine Performance of Biodiesel Fuel Prepared from Soybean Soapstack: A High Quality Renewable Fuel Produced from a Waste Feedstock", *Energy Fuels* 2001, 15: 1207-1212.

Haas, M. J. et al., "Improving the Economics of Biodiesel Production Through the Use of Low Value Lipids as Feedstocks: Vegetable Oil soapstock", *Fuel Process. Technol.* 2005, 86: 1087-1096.

Harvey, A. P. et al., "Process Intensification of Biodiesel Production Using a Continuous Oscillatory Flow Reactor", *J. Chem. Technol. Biotechnol.* 2003, 78: 338-341.

Henry, R. A. et al., "A Novel Chemical Route to Stable, Regenerable Zirconia-Based Chiral Stationary Phases for HPLC", *American Laboratory (News Edition)* 2005, 37: 22-24.

Hill, J. et al., "Environmental, Economic, and Energetic Costs and Benefits of Biodiesel and Ethanol Biofuels", *PNAS* 2006, 103(30): 11206-11210.

Ishihara, K. et al., "Direct Ester Condensation from a 1:1 Mixture of Carboxylic Acids and Alcohols Catalyzed by Hafnium (IV) or Zirconium (IV) Salts.", *Tetrahedron* 2002, 58: 8179-8188.

Kahn, A., "Research into Biodiesel Catalyst Screening and Development", *Thesis, University of Queensland Brisbane* 2002, 1-41.

Kiss, Anton A. et al., "Solid Acid Catalysts for Biodiesel Production—Towards Sustainable Energy", *Adv. Synth. Catal.* 2006, 348: 75-81.

Knothe, G., "Analytical Methods Used in the Production and Fuel Quality Assessment of Biodiesel", *Transactions of the ASAE* 2001, 44(2): 193-200.

Kulkarni, Mangesh G. et al., "Solid Acid Catalyxed Biodiesel Production by Simultaneous Esterification and Transesterification", *Green Chem.* 2006, 8: 1056-1062.

Kulkarni, M. et al., "Waste Cooking Oil: An Economical Source for Biodiesel", *Ind. Eng. Chem. Res.* 2006, 45: 2901-2913.

Lopez, D.E. et al., "Transesterification of Triacetin with Methanol on Solid Acid and Base Catalysts", *Appl. Catalysis A: General* 2005, 295: 97-105.

Lotero, E. et al., "Synthesis of Biodiesel Via Acid Catalysis", *Ind. Eng. Chem. Res.* 2005, 44:5353-5363.

Ma, R et al., "Biodiesel Production: A Review", *Bioresource Technol.* 1999, 70:1-15.

Miller, Dennis J. et al., "Catalysis for Biorenewables Conversion", *National Science Foundation Workshop Report* www.egr.msu.edu/apps/nsfworkshop Apr. 13, 2004, 1-63 (web).

Mittelbach, Martin et al., "Diesel Fuel Derived from Vegetable Oils, III. Emission Tests Using Methyl Esters of Used Frying Oil", *JAOCS* Jul. 1988, vol. 65, No. 7, 1185-1187.

Nawrocki, J. et al., "Chemistry of Zirconia and Its Use in Chromatography", *J. Chromatog.* 1993, A 657: 229-282.

Omota, F. et al., "Fatty Acid Esterification by Reactive Distillation: Part 2—Kinetics-based Design for Sulphated Zirconia Catalysts", *Chemical Engineering Science* 2003, 58: 3175-3185.

Ondrey, G., "Biodiesel Production Using a Heterogeneous Catalyst", *Chemical Engineering* 2004, 111(11):13.

Otera, J., "Transesterification", *Chem. Rev.* 1993, 93:1449-1470.

Peterson, C. L. et al., "Continuous Flow Biodiesel Production", *Appl. Eng. Agricul.* 2002, 18: 5-11.

Pinto, A. C. et al., "Biodiesel: An Overview", *J. Braz. Chem. Soc.* 2005, 16: 1313-1330.

Pruszko, R., "Strategic Biodiesel Decisions", *Iowa State University—University Extension* CIRAS 2006, 1-32.

Raddi De Araujo, Lucia R. et al., "H3PO4/AI2O3 Catatysts: Characterization and Catalytic Evaluation of Oleic Acid Conversion to Biofuels and Biolubricant", *Materials Research* 2006, vol. 9, No. 2, 181-184.

Reisch, Marc S., "Start-up Firms Pursue Biofuels: Entrepreneurs invigorate search for economical biomass-based fuels", *Chemical & Engineering News* Nov. 20, 2006, vol. 84, No. 47.

Rigney, M. P. et al., "Physical and Chemical Characterization of Microporous Zirconia", *J. Chromatog* 1990, 499: 291-304.

Schuchardt, Ulf et al., "Transesterification of Vegetable Oils: a Review", *J. Braz. Chem. Soc.* 1998, vol. 9, No. 1, 199-210.

Suppes, G. J. et al., "Transesterification of Soybean Oil with Zeolite and Metal Catalysts", *Applied Catalysis A: General* 2004, 257: 213-223.

Tyson, K. S., "Brown Grease Feedstocks for Biodiesel", *National Renewable Energy Laboratory* Jun. 19, 2002, 1-34.

Verkade, J. G. et al., "Nanoporous Solid Catalysts for Conversion of Soybean Oil to Biodiesel", *Center for Catalysis*, Iowa State University http://www.iprt.iastate.edu/ccat/nano.html, Feb. 22 2006, 1-4.

Xie, W. et al., "Synthesis of Biodiesel from Soybean Oil Using Heterogeneous KF/ZnO Catalyst", *Catalyst Letters* Feb. 2006, 107: 53-59.

Zhang, P., "A New Process for Biodiesel Production Based on Waste Cooking Oils and Heterogeneous Catalysts", *USDA-SBIR Agreement #2005-33610-15497* 2005, 1-2.

Liu, Yijun et al., "Transesterification of Poultry Fat with Methanol Using Mg-Al Hydrotalcite Derived Catalysts", *Applied Catalysis A: General* (Abstract only) 2007, vol. 331, 138-148.

Bryan, Tom, "Adsorbing It All", *Biodiesel Magazine* Mar. 2005, 40-43.

Elliott, Brian, "Low-cost Biodiesel Production Process Using Waste Oils and Fats", *U.S. EPA SBIR Phase I Kick-Off Meeting* www.iastate.edu/Inside/2003/0613/biorenewable.jpg Apr. 5, 2007, 1.

Iijima, Wataru et al., "" Winterized" Bio-Diesel Fuel Produced from Animal Fat", *Agro-Energy Laboratory, Dept. of Farm Mechanization and Engineering, National Agricultural ResearchCentre National Agricultural Research Organization*, JAPAN Unknown, 1-2.

Iijima, Wataru et al., "The Non-glycerol Process of Biodiesel Fuel Treated in Supercritical Methanol (Abstract)", Paper No. 046073, *2004 ASAE Annual Meeting* 2004, 1.

Knothe, Gerhard et al., "Bidiesel: The Use of Vegetable Oils and Their Derivatives as Alternative Diesel Fuels", *Oil Chemical Research, National Center for Agricultural Utilization Research, Agricultural Research Service, U.S. Department of Agriculture*, Peoria, IL 61604 Unknown, 1-36.

Koh, Ashley D. et al., "Non-Catalytic Biodiesel Production from Soybean Oil Using Supercritical Methanol", *The 2006 Annual Meeting* San Francisco, CA http://aiche.confex.com/aiche/2006/techprogram/P69978.HTM presented Nov. 15, 2006 , 1.

Lopez, Dora E. et al., "Esterification and transesterification on tungstated zirconia: Effect of calcination temperature", *Journal or Catalysis* Apr. 1, 2007 , vol. 247, Iss. 1, 43-50.

Suwannakarn, Kaewta et al., "A comparative study of gas phase esterification on solid acid catalysts", *Catalysis Letters* Apr. 2007 , vol. 114, Nos. 3-4, 1-7.

Unknown, "Amberlitetm FP Ion Exchange Resins", *Amberlite FP technical bulletin* http://www.advancedbiosciences.com Dec. 2004 , 1-7.

Unknown, "Oak Ridge lab develops materials for biodiesel catalysis", *Biodiesel Magazine* http://biodieselmagazine.com/article-print.jsp?article_id=1580 Unknown , 1.

Unknown, "Standard Test Method for Acid Number of Petroleum Products by Potentiometric Titration", *ASTM International* Mar. 2004 , 1-7.

Furuta S. et al. "Biodiesel Fuel Production With Solid Superacid Catalysis In Fixed Bed Reactor Under Atmospheric Pressure", Catalysis Communcations, Elsevier Science, vol. 5, No. 12, Dec. 1, 2004; pp. 721-723.

Lopez, et al. "Transesterification Of Triacetin With Methanol On Solid Acid And Base Catalylsts", Applied Catalysis A; vol. 295, No. 2; Nov. 9, 2005, pp. 97-105.

PCT International Search Report mailed Jul. 9, 20008 for PCT/US2007/075211.

U.S. Appl. No. 61/103,513, Entitled "*Catalysts, Systems, And Methods For Producing Fuels And Fuel Additives From Polyols*", Filed on Oct. 7, 2008.

U.S. Appl. No. 61/139,684, Entitled "*Systems and Methods for Producing Fuels and Fuel Precursors from Carbohydrates*", Filed on Dec. 22, 2008.

U.S. Appl. No. 61/113,854, Entitled "*Systems and Methods for Producing Fuels from Biomass*", Filed on Nov. 12, 2008.

U.S. Appl. No. 61/088,602, Entitled "*Systems For Selective Removal Of Contaminants From A Composition And Methods Of Regenerating The Same*", Filed on Aug. 13, 2008.

File History in co-pending U.S. Appl. No. 12/030,801, Entitled "*Devices and Methods for Selective Removal of Contaminants from a Composition*" (pp. 1-237).

International Search Report and Written Opinion from International Application No. PCT/US2008/053883, mailed Jul. 9, 2008 (pp. 1-13).

Dorsa, Renato et al., "Basics of Alkali Refining of Vegetable Oils", *GEA Westfalia Separator Food Tec GmbH* Unknown , 1-28.

"EP Communication, EPO form 2906 01.91TRI, from the European Patent Office in EP Patent Application No. 07840692.3, corresponding to U.S. Appl. No. 11/833,839, mailed Dec. 11, 2009, (pp. 1-4)".

"EP Communication, EPO form 2906 01.91TRI, from the European Patent Office in EP Patent Application No. 08729792.5, corresponding to U.S. Appl. No. 12/030,801, mailed Mar. 2, 2010, (pp. 1-4)".

"Kyte Centrifuge Sales & Consulting", www.kcentrifuge.com , p. 1.

Annen, et al., "Development of Porous Zirconia Spheres by Polymerization-Induced Colloid Aggregation-Effect of Polymerization Rate", *Journal of Mater. Sci.*, 29(23):6123-6130 (1994).

Anon, , "Beatrice Biodiesel Selects Axens Exterfip-H Technology", *Biodiesel Magazine* Jun. 2006 , Unknown.

Demirbas, Ayhan , "Biodiesel fuels from vegetable oils via catalytic and non-catalytic supercritical alcohol transesterifications and other methods: a survey", *Energy Conversion & Management* 2003 , issue 44 pp. 2093-2109.

Silva, Lisa et al., "Colorado Diesel School Bus Retrofit Program", A Cooperative Effort of the Regional Air Quality Council and the Colorado Department of Public Health and Environment 2006 , 1-17.

Vieitez, Ignacio et al., "Continuous Production of Soybean Biodiesel in Supercritical Ethanol-Water Mixtures", *American Chemical Society, Energy & Fuels* Jun. 17, 2008 , pp. 1-5.

Yokoyama, Shin-Ya et al., "Liquid Fuel Production from Ethanol Fermentation Stillage", *Chemistry Letters* 1986 , pp. 649-652.

He, Chen et al., "Biodiesel Production by the transesterification of cottonseed oil by solid acid catalysts", *Frontiers of Chemical Engineering in China* Feb. 2007, vol. 1, No. 1, pp. 1673-7369.

He, Chen et al., "Biodiesel from Transesterification of Cotton Seed Oil by Solid Bases Catalysis", *Journal of Chemical Engineering of Chinese Universities* Aug. 2006, No. 4 vol. 20.

"File History for co-pending U.S. Appl. No. 12/238,750, "Methods and Compositions for Refining Lipid Feed Stocks," (168 pages)",.

* cited by examiner

US 7,897,798 B2

METHODS AND APPARATUS FOR PRODUCING ALKYL ESTERS FROM LIPID FEED STOCKS AND SYSTEMS INCLUDING SAME

This application claims the benefit of U.S. Provisional Application No. 60/821,498, filed Aug. 4, 2006, U.S. Provisional Application No. 60/825,575, filed Sep. 13, 2006, and U.S. Provisional Application No. 60/889,730, filed Feb. 13, 2007, the contents of all of which are herein incorporated by reference.

FIELD OF THE INVENTION

The present invention relates to the production of alkyl esters from lipid feed stocks. More specifically, the present invention relates to methods and apparatus including metal oxide catalysts for producing alkyl esters from lipid feed stocks.

BACKGROUND OF THE INVENTION

The term "biodiesel" refers to a diesel-equivalent, processed fuel derived from biological sources, such as vegetable oils and/or animal fats. Biodiesel is a processed fuel that can be readily used in vehicles with diesel engines. Biodiesel can be used in pure form or may be blended with petroleum diesel at any concentration in most modern diesel engines. The use of biodiesel offers many advantages. For example, it has been estimated that biodiesel reduces emissions of carbon monoxide (CO) by approximately 50% and carbon dioxide by 78% on a net lifecycle basis because the carbon in biodiesel emissions is recycled from carbon that was already in the atmosphere, rather than being fossil carbon from petroleum that was previously sequestered in the earth's crust. In addition, biodiesel is generally biodegradable and non-toxic.

Biodiesel typically includes alkyl esters of fatty acids. The alkyl group is commonly methyl, ethyl, propyl, or isopropyl, although it can also include higher numbers of carbon atoms. Alkyl esters can be produced from fats or oils via catalyzed or uncatalyzed reactions. Catalyzed reactions for producing alkyl esters can be categorized as either homogeneous or heterogeneous catalyst reactions. The definition of homogeneous and heterogeneous is from the perspective of the catalyst. In a homogeneous reaction, the catalyst is completely dissolved in one of the feed stocks, such as the alcohol, whereas in a heterogeneous reaction the catalyst forms a mixture (it is not dissolved completely) with the total reaction mixture. Reactions for producing biodiesel can specifically include: 1) direct base catalyzed transesterification of the oil or fat with an alcohol; 2) direct acid catalyzed transesterification of the oil or fat with an alcohol; and 3) initial conversion of the oil triglycerides to fatty acids and then to alkyl esters via acid catalyzed esterification.

The direct base catalyzed method, with the base dissolved within the reactants (homogenous catalyst), is currently favored for industrial production of alkyl esters because the underlying reaction is generally faster than some other methods. In the base-catalyzed method, triglycerides from a fat or oil (such as soybean oil) are reacted with a short chain alcohol such as methanol or ethanol in the presence of an alkaline catalyst. The alkaline catalyst is usually sodium or potassium hydroxide that has been dissolved in the short chain alcohol. The short chain alcohol is generally added in a molar excess (e.g., greater than 3:1 of alcohol:triglyceride) to promote conversion of the lipid to biodiesel. The direct base homogenous catalyzed method is commonly conducted in a batch processing mode where the reactants are mixed together in a batch, allowed to react and then the biodiesel is harvested from the resulting mixture.

However, a need remains for methods and apparatus for producing alkyl esters that can be applied in an economical biodiesel production system.

SUMMARY OF THE INVENTION

The present invention relates to methods and apparatus for producing alkyl esters from lipid feed stocks, such as plant oils and/or animal fats, and systems including the same. In an embodiment, the invention includes a process for producing alkyl esters including mixing a lipid feed stock with an alcohol to form a reaction mixture, contacting the reaction mixture with a catalyst under supercritical conditions for the alcohol, the catalyst comprising an unmodified metal oxide selected from the group consisting of alumina, titania, zirconia, and hafnia, and removing residual free fatty acids from the reaction mixture.

In an embodiment, the invention includes a process for producing alkyl esters including mixing a lipid feed stock with an alcohol to form a reaction mixture, contacting the reaction mixture with a catalyst under supercritical conditions for the alcohol, the catalyst comprising a metal oxide selected from the group consisting of alumina, titania, zirconia, and hafnia, wherein the metal oxide has been treated with a Brønsted acid or a Brønsted base, and removing residual free fatty acids from the reaction mixture.

In an embodiment, the invention includes a process for producing alkyl esters via transesterification or esterification from a feed stock including mixing the feed stock with an alcohol to form a reaction mixture, the feed stock comprising a triglyceride or a carboxylic acid; and pumping the reaction mixture into a housing comprising a porous catalyst, the porous catalyst comprising an average particle size of about 0.2 microns to about 1 millimeter, the temperature and pressure within the housing comprising supercritical conditions for the alcohol, the porous catalyst comprising an unmodified metal oxide selected from the group consisting of alumina, titania, zirconia, and hafnia and collecting a reaction product from the housing, the reaction product comprising esters in an amount at least equal to 80% of the triglyceride or carboxylic acid in the feed stock on a molar basis.

The above summary of the present invention is not intended to describe each discussed embodiment of the present invention. This is the purpose of the figures and the detailed description that follows.

BRIEF DESCRIPTION OF THE FIGURES

The invention may be more completely understood in connection with the following drawings, in which.

Figure 1:
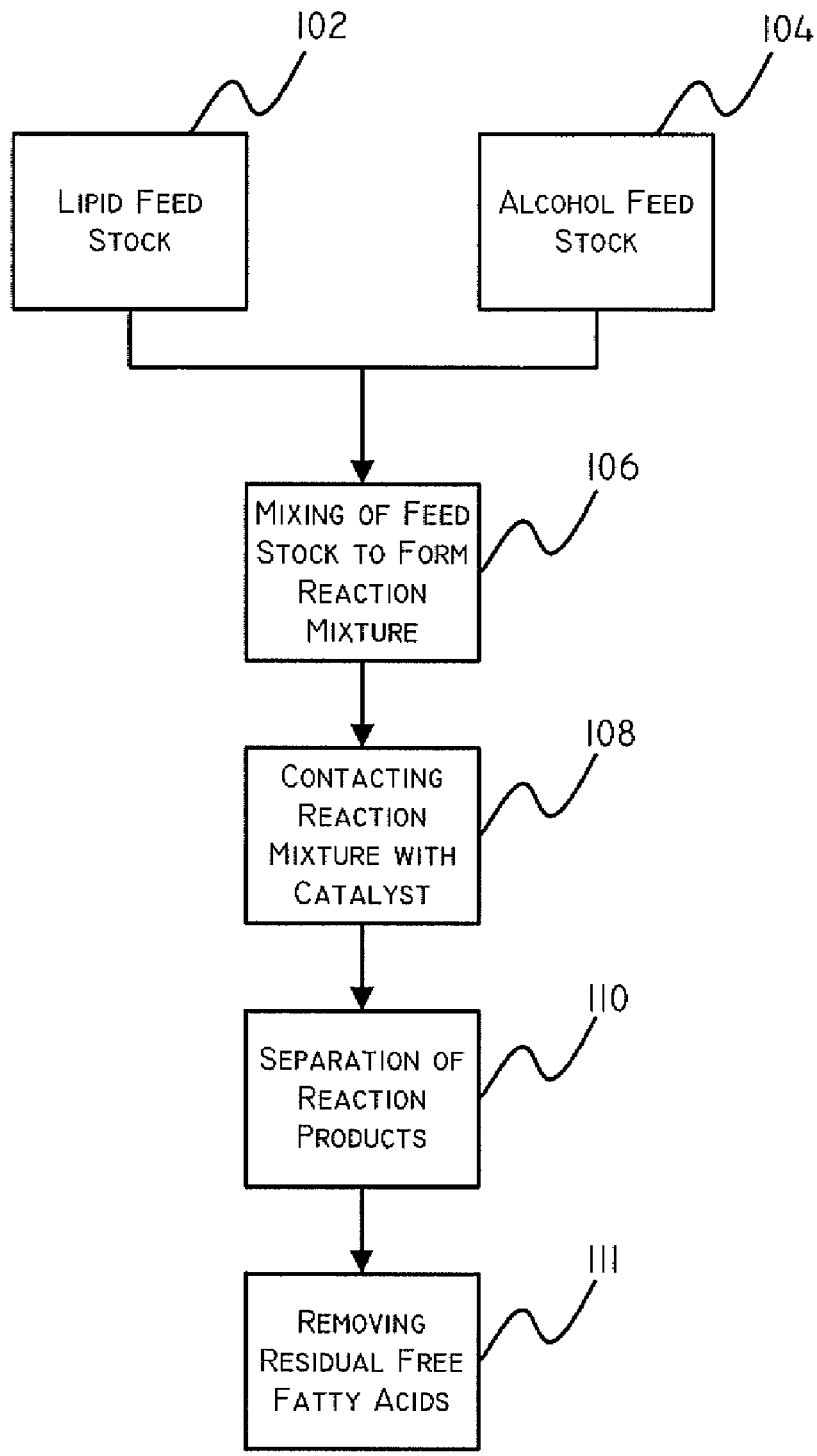
FIG. 1 is a schematic view of a method of producing alkyl esters in accordance with an embodiment of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

As described above, alkyl esters can be produced from fats or oils via catalyzed or uncatalyzed reactions. Catalyzed reactions for producing alkyl esters can be categorized as either homogeneous or heterogeneous reactions. In a homogeneous reaction, the catalyst is completely dissolved in one of the feed stocks, such as the alcohol, whereas in a heterogeneous reaction the catalyst is not dissolved.

Processes using homogenous catalysts are currently favored for the commercial production of alkyl ester compositions. However, homogenous acid or base catalysts generally require a costly neutralization and fuel washing steps to extract the catalysts after the reaction, making those processes less economical and requiring the use of more water.

Applicants have discovered methods of economically producing alkyl esters using metal oxides that function as heterogeneous catalysts. Heterogeneous catalysts offer various advantages including the ability to conduct transesterifications and esterifications simultaneously while simplifying later separation steps.

Specifically, applicants have discovered methods of economically producing alkyl esters using metal oxide catalysts that function as heterogeneous catalysts under supercritical conditions for the specific alcohol being used. Supercritical conditions are defined as a temperature and pressure above a compound's critical temperature and pressure points. As an example, in some embodiments, the method can include the use of methanol at supercritical conditions. The thermodynamic critical point for methanol is a temperature of 512.6 degrees Kelvin and a pressure of 8.09 MPa (or 79.8 atm).

Many previous approaches for producing biodiesel fuel compositions include the use of temperature and pressure conditions that are substantially below supercritical conditions for alcohols such as methanol. One reason for this includes the established view that processes requiring lower energy input are generally more economical. Another reason includes a concern for the possible uncontrolled further break down of reaction products into potentially undesirable byproducts.

However, contrary to the established views, the applicants have discovered that employing supercritical methanol conditions along with the metal oxides catalysts as described herein can offer various advantages. For example, the residence times that can be achieved when using supercritical conditions with the metal oxide catalysts described herein are extremely low, allowing high output volume for a given plant size, thereby making the production process more economical. In addition, in some embodiments, the use of supercritical conditions with the metal oxide catalysts described herein results in the formation of higher value reaction products. Typically, reaction products from the transesterification of triglycerides include fatty acid alkyl esters and glycerol. The amount of glycerol produced in many transesterification reactions depends on many factors including the precise compositions and quantities of the feed stocks used but can frequently be around 10% by mass. However, in some embodiments of the invention, the formation of higher value byproducts, such as dimethyl ether have been observed, which can then be captured and sold making the overall process more economically efficient.

In some embodiments of the invention the amount of glycerol produced can be reduced to less than about 10% by mass. In some embodiments of the invention the amount of glycerol produced can be reduced to less than about 5% by mass. In some embodiments of the invention the amount of glycerol produced can be reduced to about 1% or less by mass. It is believed that in such circumstances the glycerol from the reaction is further broken down into other byproducts.

Lipid feed stock costs are the single highest contributor to the overall cost of production of biodiesel fuel. As such, it is desirable to utilize inexpensive low value feed stocks. However, low value feed stocks such as animal fats and waste cooking oils typically have high levels of free fatty acids, which cannot be converted to biodiesel using traditional base catalysis methods. However, methods and catalysts of the invention operating at supercritical conditions are capable of both esterification and transesterification and can therefore be used to convert both free fatty acids and triglycerides from low value feed stocks into biodiesel resulting in a more economical biodiesel production cost.

Metal oxides used with embodiments of the invention can include metal oxides whose surfaces are dominated by Lewis acid-base chemistry. A Lewis acid is an electron pair acceptor. Metal oxides of the invention can have Lewis acid sites on their surface and can specifically include alumina, zirconia, titania and hafnia. Metal oxides of the invention can also include silica clad with a metal oxide selected from the group consisting of zirconia, alumina, titania, hafnia, zinc oxide, copper oxide, magnesium oxide and iron oxide. In some embodiments, metal oxides can include yttria (yttrium oxide), such as yttria stabilized zirconia. In some embodiments, metal oxides can include magnesium oxide and/or cerium dioxide. Metal oxides of the invention can also include mixtures of metal oxides. Specifically metal oxides of the invention can include mixtures including one or more of zirconia, alumina, titania and hafnia.

One issue associated with many previous methods for producing biodiesel is that the catalysts used are subject to poisoning over time. Specifically, many existing catalysts are affected by the reaction conditions (e.g., pH, temperature, pressure) in a manner so as to reduce reaction yield over time. However, some embodiments of metal oxide catalysts as described herein are advantageous because they are highly resistant to poisoning over time. This is particularly significant in the context of supercritical reaction conditions, which may otherwise tend to promote catalyst poisoning. Of the various metal oxides that can be used with embodiments of the invention, zirconia, titania and hafnia offer particular advantages because they are very chemically and thermally stable and can withstand very high temperatures and pressures (such as supercritical conditions for various alcohols) as well as extremes in pH. Such catalysts can exhibit a resistance to poisoning over time. In some embodiments, the metal oxide catalyst can include zirconia, titania, and/or hafnia. Zirconia and hafnia are even more thermally stable than titania. In some embodiments, the metal oxide catalyst can include zirconia and/or hafnia.

Some feed stocks may include components, such as lecithin, that can lead to the deposit of residues resulting in clogging and/or obstruction of a transesterification reactor. The significant thermal stability of metal oxides used with embodiments of the invention can be advantageous in this context because the reactor can be cleaned out through the use of an oxygen containing gas or liquid at extremely high temperatures to combust any residue that has been deposited on the metal oxide catalyst, thereby cleaning the reactor and returning it to its original state. Other types of catalysts may not have sufficient thermal stability to perform such a cleaning/regeneration process.

In some embodiments, the metal oxides used with embodiments of the invention can be bare or unmodified. As used herein, the term "unmodified metal oxide" shall refer to a metal oxide that includes substantially only the metal oxide at its surface, and thus does not include significant concentrations of chemical groups such as phosphates or sulfates on its surface. Many conventional catalyst materials include various modifying groups to enhance catalysis. However, as shown in the examples herein, unmodified metal oxides can surprisingly be used to achieve high conversion percentages and relatively small residence times.

However, in other embodiments, metal oxides of the invention can be modified with another compound. For example, the Lewis acid sites on metal oxides of the invention can interact with Lewis basic compounds. Thus, metal oxides of the invention can be modified by adsorbing Lewis basic compounds to the surface of metal oxides of the invention. A Lewis base is an electron pair donor. Lewis basic compounds of the invention can include anions formed from the dissociation of acids such as hydrobromic acid, hydrochloric acid, hydroiodic acid, nitric acid, sulfuric acid, perchloric acid, boric acid, chloric acid, phosphoric acid, pyrophosphoric acid, methanethiol, chromic acid, permanganic acid, phytic acid and ethylenediamine tetramethyl phosphonic acid (EDTPA).

While not intending to be bound by theory, the use of strong acids as a modifying group can be advantageous because they absorb more strongly to the Lewis acid sites on the metal oxide and thus be less likely to leach off into the reaction mixture. As such, the use of phosphoric acid, for example, can be advantageous.

Lewis basic compounds of the invention can also include hydroxide ion as formed from the dissociation of bases such as sodium hydroxide, potassium hydroxide, lithium hydroxide and the like.

Metal oxides of the invention can include metal oxide particles clad with carbon. Carbon clad metal oxide particles can be made using various techniques such as the procedures described in U.S. Pat. Nos. 5,108,597, 5,254,262, 5,346,619, 5,271,833, and 5,182,016, the contents of which are herein incorporated by reference. Carbon cladding on metal oxide particles can render the surface of the particles more hydrophobic.

Metal oxides of the invention can also include polymer coated metal oxides. By way of example, metal oxides of the invention can include a metal oxide coated with polybutadiene (PBD). Polymer coated metal oxide particles can be made using various techniques such as the procedure described in Example 1 of U.S. Pub. Pat. App. No. 2005/0118409, the content of which is herein incorporated by reference. Polymer coatings on metal oxide particles can render the surface of the particles more hydrophobic.

Metal oxide catalysts of the invention can be made in various ways. As one example, a colloidal dispersion of zirconium dioxide can be spray dried to produce aggregated zirconium dioxide particles. Colloidal dispersions of zirconium dioxide are commercially available from Nyacol Nano Technologies, Inc., Ashland, Mass. The average diameter of particles produced using a spray drying technique can be varied by changing the spray drying conditions. Examples of spray drying techniques are described in U.S. Pat. No. 4,138,336 and U.S. Pat. No. 5,108,597, the contents of both are herein incorporated by reference. It will be appreciated that other methods can also be used to create metal oxide particles. One example is an oil emulsion technique as described in Robichaud et al., Technical Note, "An Improved Oil Emulsion Synthesis Method for Large, Porous Zirconia Particles for Packed- or Fluidized-Bed Protein Chromatography," Sep. Sci. Technol. 32, 2547-59 (1997). A second example is the formation of metal oxide particles by polymer induced colloidal aggregation as described in M. J. Annen, R. Kizhappali, P. W. Carr, and A. McCormick, "Development of Porous Zirconia Spheres by Polymerization-Induced Colloid Aggregation-Effect of Polymerization Rate," J. Mater. Sci. 29, 6123-30 (1994). A polymer induced colloidal aggregation technique is also described in U.S. Pat. No. 5,540,834, the content of which is herein incorporated by reference.

Metal oxide particles used in embodiments of the invention can be sintered by heating them in a furnace or other heating device at a relatively high temperature. In some embodiments, the particles are sintered at a temperature of 160° C. or greater. In some embodiments, the particles are sintered at a temperature of 400° C. or greater. In some embodiments, the particles are sintered at a temperature of 600° C. or greater. Sintering can be done for various amounts of time depending on the desired effect. Sintering can make the aggregated particles more durable. In some embodiments, the particles are sintered for more than about 30 minutes. In some embodiments, the particles are sintered for more than about 3 hours. However, sintering also reduces the surface area. In some embodiments, the particles are sintered for less than about 1 week.

In some embodiments, particles within a desired size range can be selected for use as a catalyst. For example, particles can be sorted by size such as by air classification, elutriation, settling fractionation, or mechanical screening. In some embodiments, the size of the particles is greater than about 0.2 microns. In some embodiments, the size of the particles is greater than about 0.25 µm. In some embodiments the size range selected is from about 0.2 microns to about 1 mm. In some embodiments the size range selected is from about 1 µm to about 100 µm. In some embodiments the size range selected is from about 5 µm to about 15 µm. In some embodiments the size of the particles is about 80 µm. In some embodiments the size of the particles is about 25-35 µm. In some embodiments the size of the particles is about 5 µm. The particles can be spherical or irregular in shape.

In some embodiments, metal oxide particles used with embodiments of the invention are porous. By way of example, in some embodiments the metal oxide particles can have an average pore size of about 30 angstroms to about 2000 angstroms. However, in other embodiments, metal oxide particles used are non-porous.

The anion of an acid can be adhered to a particle by refluxing particles in an acid solution. By way of example, the particles can be refluxed in a solution of sulfuric acid. Alternatively, the anion formed from dissociation of a base, such as the hydroxide ion formed from dissociation of sodium hydroxide, can be adhered to a particle by refluxing particles in a base solution. By way of example, the particles can be refluxed in a solution of sodium hydroxide. The base or acid modification can also be achieved under exposure to the acid or base in either batch or continuous flow conditions when disposed in a reactor housing at elevated temperature and pressure to speed up the adsorption/modification process. In some embodiments, fluoride ion, such as formed by the dissociation of sodium fluoride, can be adhered to the particles.

Metal oxide particles used in embodiments of the invention can be packed into a housing, such as a column. The metal oxide particles disposed in a housing can form a fixed bed reactor. Disposing the metal oxide particles in a housing can offer the advantage of facilitating continuous flow processes. Many different techniques may be used for packing the metal oxide particles into a housing. The specific technique used may depend on factors such as the average particle size, the type of housing used, etc. Generally speaking, particles with an average size of about 1-20 microns can be packed under pressure and particles with an average size larger than 20 microns can be packed by dry-packing/tapping methods or by low pressure slurry packing. In some embodiments, the metal oxide particles of the invention can be impregnated into a membrane, such as a PTFE membrane.

Referring now to FIG. 1, a schematic view of an exemplary process of producing alkyl esters is shown. A lipid feed stock 102 is held in a first reservoir. The lipid feed stock 102 can include various types of plant oils and animal fats as described more fully below. The first reservoir can optionally include an agitation mechanism and temperature control to keep the components in the first reservoir thoroughly mixed. An alcohol feed stock 104 is held in a second reservoir. The alcohol feed stock 104 can include one or more types of alcohol as described more fully below. Although the lipid feed stock 102 and the alcohol feed stock 104 in the embodiment shown herein are in different reservoirs, it will be appreciated that in some embodiments they can be disposed in the same reservoir.

In some embodiments the feed stocks, such as the lipid feed stock, can be processed in order to remove particulate matter and other debris before being processed through the reactor. By way of example, the feed stocks can be filtered or distilled. In some embodiments the feed stocks can be processed with a continuous centrifuge that can spin out all particulates and in some cases water from the lipid feed stock.

In some embodiments, a feed stock gas sparger/bubbler can be added to the system in order to displace dissolved oxygen to avoid any oxidation reactions that can potentially occur at high temperatures. In some embodiments, the feed stocks can be sparged with nitrogen gas in order to further limit potential oxidation reactions.

The biological lipid feed stock and the alcohol feed stock are then mixed to form a reaction mixture 106. Mixing may be done in a separate mixing vessel or it may be done by simply injecting one feed stock into the other. In many embodiments, the amount of alcohol supplied is in a molar excess to the stoichiometric ratio of the reaction. By way of example, for the transesterification of a triglyceride, the stoichiometric ratio is 3 moles of alcohol for every 1 mole of triglyceride. However, the reaction can be pushed farther towards completion by adding a molar excess of alcohol. Accordingly, in an embodiment an amount of alcohol is added to the reaction mixture that exceeds the ratio of 3 parts alcohol to 1 part triglyceride. However, in other embodiments the alcohol is added to the reaction mixture in a less than stoichiometric ratio. In some embodiments, the reaction mixture can have a ratio of 1-3 moles of alcohol to 1 mole of triglyceride.

In some embodiments, the reaction mixture can also include a carrier compound. A carrier compound can serve various purposes including helping to reduce the viscosity of the reaction mixture. The carrier compound can be a compound that is non-reactive under the reaction conditions. Examples of carrier compounds can include, but are not limited to, hexane, saturated cycloalkanes, and fluorinated hydrocarbons. Carrier compounds can be present in the reaction mixture in an amount from 0.0 wt. % to 99.9 wt. %. Conversely, active components, such as the lipid feed stock and the alcohol feed stock can be present in the reaction mixture in an amount from 0.1 wt. % to 100.0 wt. %.

In some embodiments, the reaction mixture can also include various types of additives. By way of example, in some embodiments, the reaction mixture can include an additive that is converted by a chemical reaction into a compound that has a scent. It is well known that some types of esters are responsible for common scents, such as fruit scents. For example, ethyl (S)-(+)-2-methylbutanoate is known to have a fruity, apple-like scent. Because metal oxides used in embodiments of the invention can catalyze the conversion of carboxylic acids to esters, in some embodiments a carboxylic acid can be added to the reaction mixture and can then be converted into an ester that imparts a distinct scent to the resulting alkyl ester product composition. A scent can be used to enhance the distinctiveness of the resulting product, such as a biodiesel product, while still allowing for the resulting biodiesel to meet ASTM testing standards. Those compounds with carboxylic acid groups that can be converted into scented esters upon esterification can be referred to as "scent precursor compounds". In an embodiment, the reaction mixture can include one or more scent precursor compounds. For example, salicylic acid can be added to the reaction mixture and will result in the production of methyl salicylate (if methanol is used as the alcohol feed stock), which has a strong wintergreen scent.

The reaction mixture can then be contacted with a metal oxide catalyst 108. In some embodiments, the metal oxide catalyst can have an acid or base adsorbed thereto. In some embodiments, the metal oxide is unmodified and does not have an acid or base adsorbed thereto. The metal oxide catalyst can be disposed within a housing. By way of example, the metal oxide catalyst can be within a column. The metal oxide catalyst can be packed within the housing such that the reaction mixture must pass between particles of the metal oxide catalyst as it passes through the housing.

In some embodiments, a pre-heating step is performed to raise the temperature of the reactants before they enter a housing containing the metal oxide catalyst. Preheating of the reactants can be performed in various ways including using a heating block, a heating bath, a counter-current heat exchanger, etc. While not intending to be bound by theory, it is believed that pre-heating the reactants can improve the efficiency of the reaction in part because of the effect pre-heating has on the maintenance of temperatures within the housing. In some embodiments, the invention includes pre-heating the reactants to at least about 70% of the reaction temperature inside of the housing containing the metal oxide catalyst. In some embodiments, the invention includes pre-heating the reactants to at least about 80% of the reaction temperature inside of the housing containing the metal oxide catalyst. In some embodiments, the invention includes pre-heating the reactants to at least about 90% of the reaction temperature inside of the housing containing the metal oxide catalyst. In some embodiments, the invention includes preheating the reactants to at least about 95% of the reaction temperature inside of the housing containing the metal oxide catalyst. In some embodiments, the invention includes preheating the reactants to substantially the same temperature as the reaction temperature inside of the housing containing the metal oxide catalyst. In some embodiments, the invention includes preheating the reactants to a temperature higher than the reaction temperature inside of the housing containing the metal oxide catalyst. In some cases, the reactants are raised to supercritical conditions before entering the inside of the reactor housing.

In many embodiments, the reaction mixture is maintained at an elevated temperature within the reactor housing. The housing can be configured to withstand the temperature and pressure under which the reaction mixture is kept. In some embodiments, a heating element is in thermal communication with the housing so as to be able to heat the reaction mixture up to the desired temperature. If the temperature of the reaction mixture is not sufficiently high, the reaction may proceed more slowly than desired. In some embodiments, the temperature of the reaction mixture is about 500 Celsius or hotter. In some embodiments, the temperature of the reaction mixture is about 100° Celsius or hotter. In some embodiments, the temperature of the reaction mixture is about 150° Celsius or hotter. In some embodiments, the temperature of the reaction mixture is about 200° Celsius or hotter. In some embodiments, the temperature of the reaction mixture is about 300° Celsius or hotter. In some embodiments, the temperature of the reaction mixture is about 350° Celsius or hotter. In some embodiments, the temperature of the reaction mixture is greater than the critical temperature of the alcohol used as a reaction feed stock.

However, in some embodiments, the temperature of the reaction mixture is less than about 500° Celsius. In some embodiments, the temperature of the reaction mixture is less than about 400° Celsius. In some embodiments, the temperature of the reaction mixture inside the reactor is between about 350° Celsius and about 400° Celsius.

In some embodiments, the reaction mixture 106 is kept under pressure. The housing can be configured to withstand the pressure under which the reaction mixture is kept. A desirable pressure for the reaction mixture 106 can be estimated with the aid of the Clausius-Clapeyron equation. Specifically, the Clausius-Clapeyron equation can be used to estimate the vapor pressures of a liquid. The Clausius-Clapeyron equation is as follows:

$$\ln\left(\frac{P_1}{P_2}\right) = \frac{\Delta H_{vap}}{R}\left(\frac{1}{T_2} - \frac{1}{T_1}\right)$$

wherein $\Delta H_{vap}$=is the enthalpy of vaporization; $P_1$ is the vapor pressure of a liquid at temperature $T_1$; $P_2$ is the vapor pressure of a liquid at temperature $T_2$, and R is the ideal gas law constant.

In an embodiment, the pressure inside the housing is greater than the vapor pressures of any of the components of the reaction mixture. In an embodiment, the pressure is greater than about 500 psi. In an embodiment, the pressure is greater than about 800 psi. In an embodiment, the pressure is greater than about 1000 psi. In an embodiment, the pressure is greater than about 1500 psi. In an embodiment, the pressure is greater than about 2000 psi. In an embodiment, the pressure is greater than about 3000 psi. In an embodiment, the pressure is greater than about 3000 psi. In an embodiment, the pressure is greater than about 4000 psi. In some embodiments, the pressure is between about 1500 psi and about 5000 psi. In some embodiments, the pressure inside the housing is greater than the critical pressure of the alcohol used in the reaction.

The reaction mixture may be passed over the metal oxide catalyst for a length of time sufficient for the reaction to reach a desired level of completion. This will in turn depend on various factors including the temperature of the reaction, the chemical nature of the catalyst, the surface area of the catalyst, and the like. The term "residence time" can be used to describe the amount of time in which the reaction product mixture interacts with the catalyst in the reactor. Embodiments of the invention can include methods and systems wherein the residence time is relatively small while still achieving high percentages of conversion. By way of example, in some embodiments the residence time is less than about 60 seconds. In some embodiment, the residence time is less than about 30 seconds. In some embodiment, the residence time is less than about 10 seconds.

After the reaction mixture is passed over the metal oxide catalyst and the reaction is driven to a desired degree of completion, components in the effluent from the reaction are separated from one another 110. By way of example, in some embodiments, the reaction produces glycerol as a byproduct and the glycerol can be separated from the alkyl esters. It will be appreciated that as used herein the terms "glycerol", "glycerine" and "glycerin" are all equivalent. Glycerol has a tendency to phase separate from alkyl esters and thus the separation process is relatively straightforward. Various types of separation devices can be used such a centrifugal fluid separator or the like. The bio-diesel fuel can then be stored in a storage tank or it can be immediately delivered to a diesel engine for use. The glycerol or other reaction products can be stored and later sold or used as a feed stock for other chemical processes or as a feedstuff for animals or for human foods after further purification methods are used.

In some embodiments, the method may optionally include a step of removing free fatty acids from the reaction mixture 111. This step of removing free fatty acids can also be referred to as a "polishing" step. This can be performed at various points in the production process such as before or after the step of separating reaction product 110 and/or before or after passing the reaction mixture over the catalyst.

In some embodiments, removing residual free fatty acids from the reaction mixture can include adding a compound to the reaction mixture that serves to react with the residual free fatty acids. Such as compound can be referred to as a residual free fatty acid scavenger or scavenging compound. An exemplary scavenging compound for this purpose is dimethyl carbonate. However, other compounds can also be used as a scavenging compound. In some embodiments, the scavenging compound can be added to the reaction mixture before contacting the reaction mixture with the catalyst. In other embodiments, the scavenging compound can be added after the transesterification reaction has taken place.

In some other embodiments, the residual free fatty acids in the reaction mixture can be removed in other ways. For example, a material can be used to absorb residual free fatty acids compounds. Specifically, metal oxide media containing acid/base surface properties such as Lewis acid sites, Brønsted base sites, and/or Brønsted acid sites can be used to selectively bind, at relatively low temperatures, and remove organic acids from fatty acid alkyl ester reaction products. This can be performed in various ways. In an embodiment, an appropriate metal oxide media can be disposed within the interior volume of a housing. A crude reaction product mixture containing free fatty acids can then be pumped into the housing. After contacting the metal oxide media, free fatty acids in the crude reaction product mixture can be bound to the metal oxide media. Next, the purified reaction product mixture can be separated out, leaving behind the metal oxide media and bound organic acids.

In some embodiments, the reaction can be performed under conditions sufficient to result in the production of aldehydes and/or ethers as a decomposition byproduct of glycerol instead of glycerol itself. In some embodiments, the reaction products include gases, such as dimethyl ether. While not intending to be bound by theory, the production of gases as a byproduct can be advantageous because it is believed to be easier to separate various gases from fatty acid alkyl esters than it is to separate out glycerol from fatty acid alkyl esters.

Depending on the specific metal oxide used to catalyze the reaction of lipids to form alkyl esters, a need may arise to periodically reprocess the catalyst. For example, in the context of modified metal oxide catalysts, the catalyst can be periodically retreated with an acid (such as sulfuric acid or phosphoric acid) or a base (such as sodium hydroxide). In the context of a continuous flow production facility, stopping production to reprocess the catalyst or to replace the catalyst may be costly and inefficient. As such, in some embodiments, at least two different reactors are included in a production system such that feed stock flow can be diverted back and forth between the reactors so that one can be taken "off-line" and recharged without interrupting the production process. After the particular reactor is recharged, such as through treatment with an acid or a base, it can be returned to service.

Because the reaction mixture is passed over a metal oxide catalyst at an elevated temperature, there is a need to dissipate heat after the reaction has gone to completion. In an embodiment, heat from the effluent products is used to heat up the biological lipid feed stock and/or alcohol feed stock through a counter-flow heat exchanger. An exemplary counter-flow heat exchanger is described in U.S. Pat. No. 6,666,074, the contents of which are herein incorporated by reference. For example, a pipe or tube containing the effluent flow is routed past a pipe or tube holding the feed stock flow or the reaction mixture. In some embodiments, a pipe-in-pipe counter-flow heat exchanger can be used. In some embodiments, a thermally conductive material, such as a metal, connects the effluent flow with the feed stock flow so that heat can be efficiently transferred from the effluent products to the feed stocks or the reaction mixture. Transferring heat from the effluent flow to the feed stock flow can make the alkyl ester production process more energy efficient since less energy is used to get the reaction mixture up to the desired temperature and promotes the mixing of the reactants for faster conversion within the continuous reactor. In some embodiments the reactor housing is a ceramic that can withstand elevated temperatures and pressures. In some embodiments, the reactor housing is a metal or an alloy of metals such as INCONEL or HASTELLOY.

In some embodiments, the reaction mixture reaches the desired level of reaction completion after one pass over the metal oxide catalyst bed or packing. However, in some embodiments, the effluent flow may be rerouted over the same metal oxide catalyst or routed over another metal oxide catalyst bed or packing so that reaction is pushed farther toward completion in measured stages.

In some embodiments two or more metal oxide catalyst beds can be used to convert lipid feed stocks to alkyl esters. For example, in some embodiments, a reaction mixture can be passed through an acid-modified metal oxide catalyst bed and a base-modified metal oxide catalyst bed in succession. The reaction temperatures within each catalyst bed can be either the same or different. In a particular embodiment, a reaction mixture is first passed through an acid-modified metal oxide catalyst bed at a relatively lower temperature and then passed through a base-modified metal oxide catalyst bed at a relatively higher temperature. The acid-modified catalyst reaction step can serve to reduce the amount of free fatty acids in the reaction mixture before it is passed on to the base-modified catalyst reaction step.

In some embodiments, an acid-modified metal oxide catalyst (such as sulfuric or phosphoric acid modified) and a base-modified metal oxide catalyst (such as sodium hydroxide modified) can be separately formed but then disposed together within a reactor housing. In such an approach, the reaction mixture passing through the reactor housing can be simultaneously exposed to both the acid and base modified metal oxide catalysts.

In some embodiments, two different metal oxides (such zirconia and titania) can be separately formed but then disposed together within a reactor housing. In such an approach, the reaction mixture passing through the reactor housing can be simultaneously exposed to both metal oxide catalysts.

It will be appreciated that the process shown in FIG. 1 can be conducted in a continuous flow mode. By way of example, the process can be carried out such that all of the steps are taking place simultaneously and feed stocks are continuously being turned into biodiesel fuel. While not intending to be bound by theory, continuous flow production of biodiesel fuel can offer substantial advantages over batch production, including being more economical. However, in another embodiment, the flow may be periodically stopped to allow for the reaction to proceed to completion and then turned back on to continue the production cycle. This process of stopping and restarting flow can be referred to as a semi-continuous flow mode.

Figure 2:
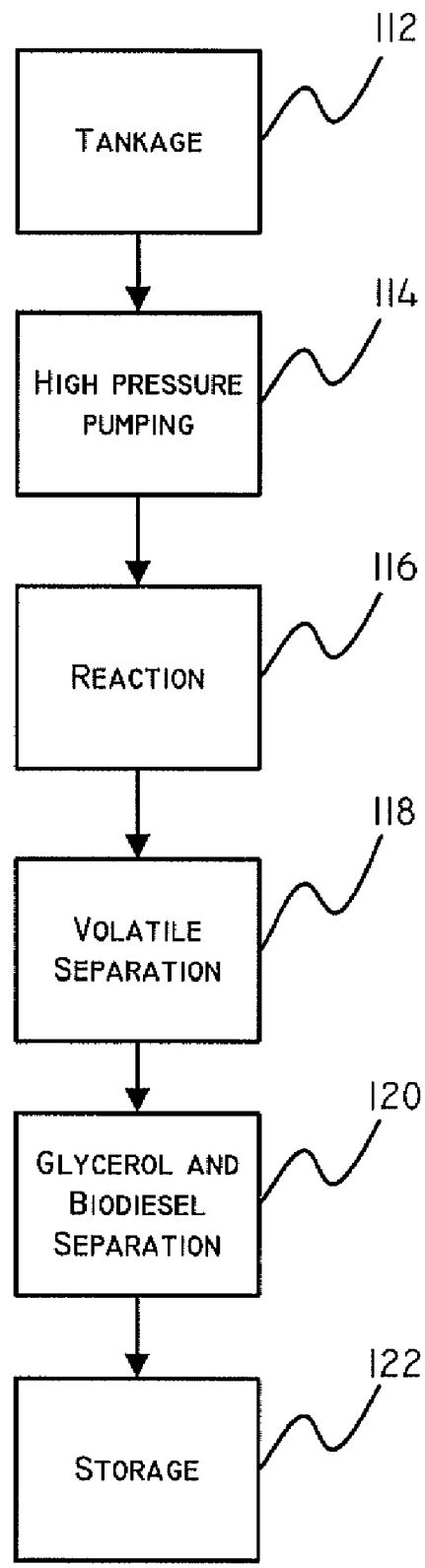
FIG. 2 is a schematic view of a method of producing alkyl esters in accordance with another embodiment of the invention.

Referring now to FIG. 2, a schematic view is shown of a method of producing alkyl esters in accordance with another embodiment of the invention. Feed stock materials (such as a lipid feed stock and an alcohol) can be stored in tanks before being used 112. The tanks can be heated or unheated. The feed stock materials are then pumped at a high pressure 114. The high pressure can be sufficient to prevent vaporization of the feed stock materials at the temperature of the reaction. Next, the feed stock materials are reacted in order to produce a reaction product composition that can include alkyl esters (such as biodiesel fuel) and byproducts (such as volatile materials and glycerol) 116. After the reaction, volatile materials (such as left over alcohol or other organic compounds) and byproduct gases are removed from the reaction product composition 118. Next, remaining byproducts (such as glycerol) are separated from the alkyl esters (such as biodiesel fuel) 120. Finally, end products such as alkyl esters and byproducts such as glycerol are stored until being used in other processes or until being shipped away from the production plant 122.

Figure 3:
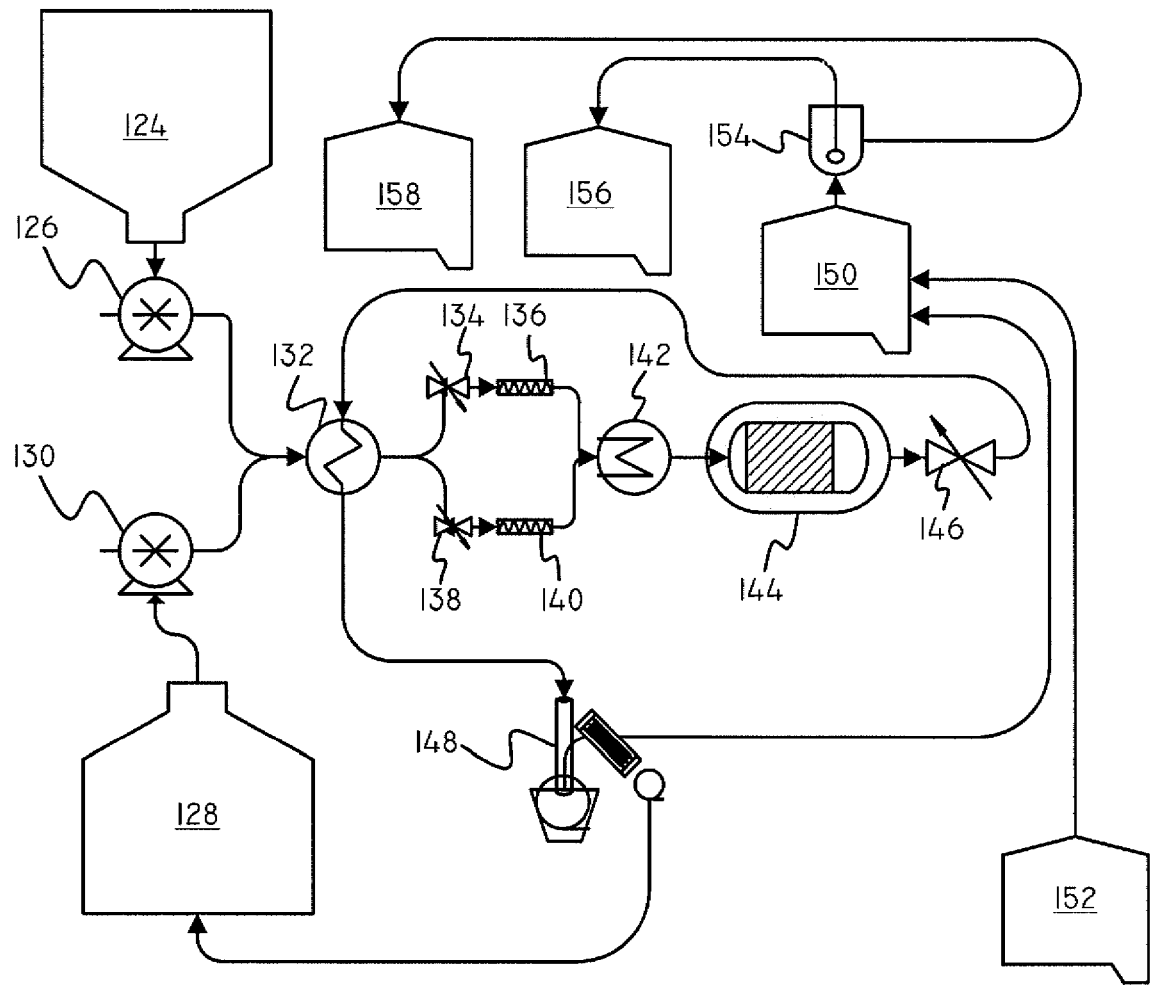
FIG. 3 is a schematic view of an alkyl ester production plant and method of producing alkyl esters in accordance with another embodiment of the invention.

Referring now to FIG. 3, a schematic diagram is shown of an alkyl ester production plant and method of producing alkyl esters in accordance with an embodiment of the invention. A lipid feed stock is held in a heated tank 124. In some embodiments, the heated tank 124 maintains the lipid feed stock at a temperature high enough to keep the lipid feed stock in a liquid state. The lipid feed stock then passes through a lipid pump 126 before passing through a heat exchanger 132 where it absorbs heat from downstream products. An alcohol feed stock is held in an alcohol tank 128. The alcohol feed stock then passes through an alcohol pump 130 before passing through a heat exchanger 132 where it too absorbs heat from downstream products. Both the alcohol and lipid source tanks may be continuously sparged with an inert gas such as nitrogen to remove dissolved oxygen from the feed stocks.

The lipid feed stock passes through a shutoff valve 134 and a filter 136 to remove particulate material of a certain size from the feed stock. The alcohol feed stock also passes through a shutoff valve 138 and a filter 140. Both the lipid feed stock and the alcohol feed stock then pass through a preheater 142 where they are mixed together to form a reaction mixture. The preheater 142 can elevate the temperature of the reaction mixture to a desired level. Many different types of heaters are known in the art and can be used.

The reaction mixture can then pass through a reactor 144 where the lipids and alcohol are converted into alkyl esters forming a reaction product mixture. The reactor can include a metal oxide catalyst. For example, the reactor can include an acid (such as sulfuric acid or phosphoric acid) modified or base (such as sodium hydroxide) modified metal oxide catalyst, or an unmodified metal oxide catalyst. The reaction product mixture can pass through a backpressure regulator 146 and the heat exchanger 132 before passing on to a distillation apparatus 148. The distillation apparatus 148 can be configured to carry out fractional distillation in order to remove excess alcohol from the reaction product mixture and/or isolate a fraction of the biodiesel fuel that meets ASTM specifications. The fractional distillation apparatus can include any desired number of theoretical plates in order to recover a desired amount of the excess alcohol and to remove any other byproducts of the reaction. In some embodiments, the recovered alcohol can be de-watered by using molecular sieves. In some embodiments, the recovered alcohol can be put back into the alcohol tank 128 for reuse.

The remaining reaction products can then pass on to a stirred tank 150 where, in some embodiments, the remaining reaction products are mixed with a base solution, such as a sodium hydroxide solution, from a base solution tank 152. The base solution can react with remaining free fatty acids in order to convert them (saponification) into a soap composition. However, it will be appreciated that in other embodiments the residual free fatty acids are removed using other methods such as those described with respect to FIG. 1 above.

The remaining reaction products and the soap composition can then pass on to a separation apparatus 154 that is configured to separate byproducts such as glycerol and the soap composition from the alkyl esters (such as biodiesel). The alkyl esters are then passed into an alkyl ester storage tank 156. The soap composition and the glycerol are then passed into a byproduct tank 158.

In some embodiments (not shown), a metal oxide can be used as a scrubber to reduce or eliminate certain components from a reaction mixture or feed stock. By way of example, in some embodiments, unmodified zirconia, titania, and/or hafnia can be used to remove free fatty acids from compositions before or after the reaction that produces fatty acid methyl esters. It is believed that free fatty acids can be adsorbed to such metal oxides and therefore removed from the reaction mixture or reaction products.

One advantage of biodiesel fuel is that it can be used to operate existing diesel engines. The proper performance of diesel engines depends on a degree of consistency in the diesel fuel itself. However, various factors can affect the consistency of the fuel made by transesterification including the specific feed stocks used, the particular separation steps used, and the type of catalysis used. For these reasons, the American Society for Testing and Materials (ASTM) has created a standard for biodiesel fuel (ASTM D6751-06a). Embodiments of the invention can be used to produce a mixture of alkyl esters that meets the specifications of ASTM D6751-06a. Specifically, embodiments of the invention can include alkyl ester solutions complying with ASTM D6751-06a.

Embodiments can also include a diesel fuel composition including fatty acid alkyl esters as the reaction product of an alcohol and biological lipid feed stock including triglycerides, wherein at least about 70% of the triglycerides on a molar basis are converted into fatty acid methyl esters. In some embodiments, at least about 80% of the triglycerides on a molar basis are converted into fatty acid methyl esters. In some embodiments, at least about 90% of the triglycerides on a molar basis are converted into fatty acid methyl esters. In some embodiments, at least about 95% of the triglycerides on a molar basis are converted into fatty acid methyl esters.

Lipid Feed Stocks

Lipid feed stocks used in embodiments of the invention can be derived from many different sources. In some embodiments, lipid feed stocks used in embodiments of the invention can include biological lipid feed stocks. Biological lipid feed stocks can include lipids (fats or oils) produced by any type of microorganism, plant or animal. In an embodiment, the biological lipid feed stocks used include triglycerides. Many different biological lipid feed stocks derived from plants can be used. By way of example, plant-based lipid feed stocks can include rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, camellia oil, castor oil, and olive oil, palm oil, coconut oil, rice oil, algae oil, seaweed oil, Chinese Tallow tree oil. Other plant-based biological lipid feed stocks can be obtained from argan, avocado, babassu palm, balanites, borneo tallow nut, brazil nut, calendula, camelina, caryocar, cashew nut, chinese vegetable tallow, cocoa, coffee, cohune palm, coriander, cucurbitaceae, euphorbia, hemp, illipe, jatropha, jojoba, kenaf, kusum, macadamia nuts, mango seed, noog abyssinia, nutmeg, opium poppy, perilla, pili nut, pumpkin seed, rice bran, sacha inche, seje, sesame, shea nut, teased, allanblackia, almond, chaulmoogra, cuphea, jatropa curgas, karanja seed, neem, papaya, tonka bean, tung, and ucuuba, cajuput, clausena anisata, davana, galbanum natural oleoresin, german chamomile, hexastylis, high-geraniol monarda, juniapa-hinojo sabalero, lupine, melissa officinalis, milfoil, ninde, patchouli, tarragon, and wormwood.

Many different lipid feed stocks derived from animals can also be used. By way of example, animal-based biological lipid feed stocks can include choice white grease, lard (pork fat), tallow (beef fat), fish oil, and poultry fat.

Many different lipid feed stocks derived from microorganisms (Eukaryotes, Eubacteria and Archaea) can also be used. By way of example, microbe-based lipid feed stocks can include the L-glycerol lipids of Archaea and algae and diatom oils.

In some embodiments, lipid feed stocks derived from both plant and animal sources can be used such as yellow grease, white grease, and brown grease. By way of example, yellow, white or brown grease can include frying oils from deep fryers and can thus include fats of both plant and animal origin. Lipid feed stocks can specifically include used cooking oil. Brown grease (also known as trap grease) can include fats extracted from sewage systems and can thus include fats of both plant and animal origin. In some embodiments, lipid feed stocks used in embodiments of the invention can include non-biological lipid feed stocks. Lipid feed stocks of the invention can include black oil.

In some embodiments, lipid feed stocks can be derived from microorganisms such as bacteria, protozoa, algae, and fungi. Lipid feed stocks of the invention can also include soap stock and acidulated soap stock.

Lipid feed stocks used with embodiments of the invention can specifically include low value feed stocks. Low value feed stocks, such as various types of animals fats and waste oils, generally have a relatively high concentration of free fatty acids. One method of assessing the concentration of free fatty acids is to determine the acid number (or acid value) of the feed stock. The acid number is the mass of potassium hydroxide (KOH) in milligrams that is required to neutralize one gram of the chemical substance being assessed. The precise acid number as measured can vary because of the heterogeneity of the lipid feed stock. However, as an example, a high value feed stock such as virgin soybean oil can have an acid number of about 0.35 whereas a lower value feed stock such as swine tallow can have an acid number of about 5. Yellow grease, a low value feed stock, can have an acid number of about 15 while acidulated soap stock, also a low value feed stock, can have an acid number of about 88 or higher.

Systems and methods of the invention can advantageously use low value feed stocks in order to produce biodiesel fuel while achieving high percent conversion rates. In some embodiments, the lipid feed stock used has an acid number of about 3 (mg KOH/g oil) or greater. In some embodiments, the lipid feed stock used has an acid number of about 5 (mg KOH/g oil) or greater. In some embodiments, the lipid feed stock used has an acid number of about 10 (mg KOH/g oil) or greater. In some embodiments, the lipid feed stock used has an acid number of about 50 (mg KOH/g oil) or greater.

Alcohols

Alcohols used in some embodiments of the invention can include many different types of alcohols. By way of example, alcohols used in some embodiments of the invention can include alcohols having from one to six carbon atoms. For example, in some embodiments, methanol is used. Methanol can be advantageous as the resulting alkyl esters (methyl esters) have a lower viscosity than higher alkyl esters. However, in some embodiments ethanol is used. Ethanol has low toxicity and is readily produced from plant matter by fermentation processes.

In some embodiments, a single alcohol is used. In other embodiments, a mixture of different alcohols is used. By way of example, a mixture of methanol and a higher molecular weight alcohol can be used. Such a mixture can offer the advantage of being more miscible with the biological lipid feed stock than methanol alone.

Other Embodiments of the Invention

In some embodiments of the invention, both acid-catalyzed and base-catalyzed transesterification is used simultaneously or in series to convert a biological lipid feed stock and an alcohol feed stock into alkyl esters. By way of example, in some embodiments, the reaction mixture of the biological lipid and the alcohol are passed over an acid modified metal oxide catalyst first and then passed over a base modified metal oxide catalyst. In such an embodiment, the acid modified metal oxide catalyst could be packed into a first column or housing and the base modified metal oxide catalyst could be packed into a second column or housing. Then the reaction mixture can be passed through the first column and then passed through the second column. Alternatively, both an acid modified metal oxide catalyst and a base modified metal oxide catalyst can be packed into one column or housing either in two segments or fully mixed. In embodiments with two or more segments or two or more columns, each segment or column can be separately held at a temperature that optimizes the esterification or transesterification reaction. While not intending to be bound by theory, it is believed that using both an acid modified metal oxide catalyst and a base modified metal oxide catalyst can offer the advantages of fast reaction rates, high yields, and reduced byproducts.

Figure 4:
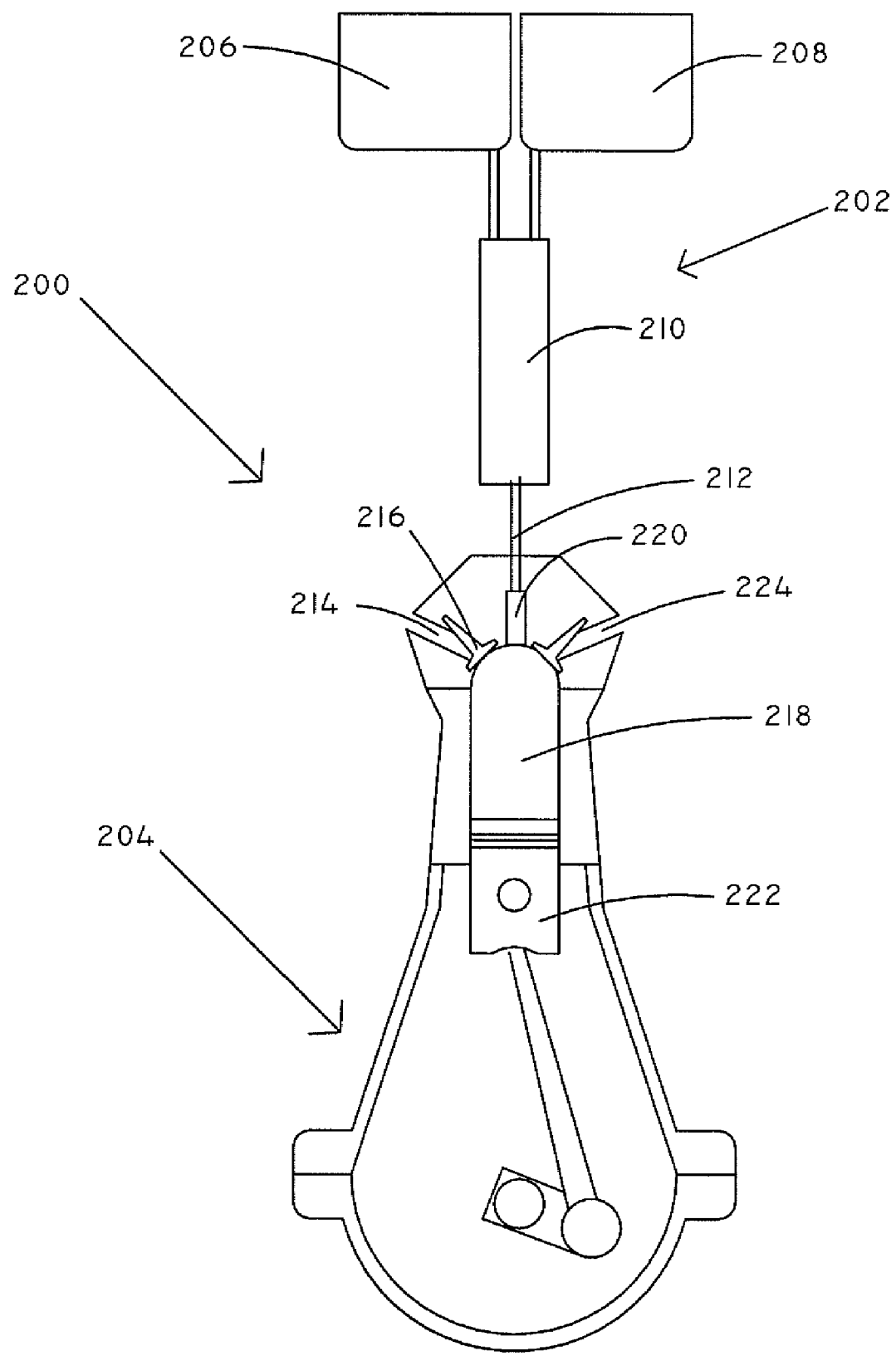
FIG. 4 is a schematic view of a diesel power plant system in accordance with an embodiment of the invention.

Methods and catalysts for producing biodiesel as described herein can be very advantageous because of the relatively low residence times and the robust nature of the catalyst. The low residence times can enable a relatively small production reactor to produce significant amounts of biodiesel fuel. This in turn allows production reactors as described herein to be used in conjunction with other equipment where traditional biodiesel production reactors would simply not be practical because of their size and their residence times. By way of example, embodiments of the invention can include diesel power plant systems including a biodiesel production reactor. Referring now to FIG. 4, a schematic view of a diesel power plant system 200 is shown in accordance with an embodiment of the invention. A continuous-flow biodiesel production reactor 202 is in fluid communication with a diesel engine 204. The continuous-flow biodiesel production reaction 202 includes a biological lipid feed stock reservoir 206 and an alcohol feed stock reservoir 208. Both feed stock reservoirs 206 and 208 are connected to a reactor housing 210. The reactor housing 210 contains a metal oxide catalyst. The biodiesel fuel (including alkyl esters) produced in the reactor housing 210 flow through a conduit 212 into the diesel engine 204.

The diesel engine 204 takes in air through an air intake port 214. The incoming air then passes through a valve 216 into a combustion chamber 218. A piston 222 compresses air within the combustion chamber 218 heating it up. The biodiesel fuel is then injected into the combustion chamber 218 through an injection port 220. The heated air within the combustion chamber 218 ignites the fuel and the piston 222 is propelled downward. Exhaust gases from the combustion of the biodiesel fuel pass out of the engine through an exhaust port 224. Heat from the combustion can be used to heat the reactor to a desired optimum temperature.

In some embodiments, the continuous-flow biodiesel production reactor 202 can produce biodiesel fuel fast enough to supply the diesel engine 204 with fuel without the need for the engine to draw upon stored biodiesel fuel in a separate tank. For example, the biodiesel production reactor 202 can produce biodiesel fuel at a rate exceeding the peak demand rate of the diesel engine 204 to which it is paired.

The pairing of a biodiesel production reactor, such as those described herein, along with a diesel engine can be uniquely complementary. For example, in some embodiments, the heat of combustion from the engine can be used to heat the reactor 202. In other words, heat generated by diesel combustion that needs to be dissipated can be beneficially used as the heat input for the biodiesel production reactor. This is particularly advantageous in the context of methods of producing biodiesel as described herein that include reaction conditions with extremely high temperatures. In some embodiments a cooling system from the engine, such as a radiator or other heat exchanger device, may be used to help control the temperature of the reactor 202.

The diesel power plant system 200 may also include other components. By way of example, the diesel power plant system 200 may also include a separation membrane or a centrifugal separation device that can separate glycerol or impurities from the biodiesel fuel. The diesel power plant system 200 can also include a monitoring system that monitors the quality of the biodiesel being produced to ensure that the biodiesel fuel being produced is of a sufficient quality for use in the diesel engine 204.

In some embodiments, the diesel power plant system 200 is light enough and small enough in size that it can be mounted on or in diesel powered equipment such as vehicles, planes, cars, trucks, ships, construction equipment, earth movers, bulldozers, locomotives, fork lifts, generators, irrigation pumps, tractors, combines, and the like. In an embodiment, the invention includes a piece of diesel powered equipment including a housing, a diesel engine disposed within the housing, and a continuous-flow biodiesel production reactor in direct or indirect fluid communication with the diesel engine, the reactor comprising a catalyst housing, and a metal oxide catalyst disposed within the catalyst housing.

Furthermore, the relatively small size production reactors that are possible with embodiments of the invention can be disposed on a mobile unit, such as a trailer. Such a mobile unit with a reactor can easily moved to sites that produce feed stock oils, such as farms, and can therefore convert these feed stocks into biodiesel at the farm site where the fuel can be used to satisfy the energy needs of the farm. This approach offers various advantages reducing the need to ship biodiesel fuel thereby reducing another large cost associated with biodiesel fuel production. In an embodiment, the invention includes a biodiesel production reactor mounted on a mobile platform such as a trailer or a truck.

The present invention may be better understood with reference to the following examples. These examples are intended to be representative of specific embodiments of the invention, and are not intended as limiting the scope of the invention.

EXAMPLES

Example 1

Formation of Zirconia Particles

A colloidal dispersion of zirconium oxide (NYACOL™ ZR 100/20) (Nyacol Nano Technologies, Inc., Ashland, Mass.), containing 20 wt. % $ZrO_2$ primarily as about 100 nm particles was spray dried. As the dispersion dried, the particles interacted strongly with one another to provide aggregated $ZrO_2$ particles. The dried aggregated particles that were obtained were examined under an optical microscope and observed to consist mostly of spherules from about 0.5 μm to about 15 μm in diameter.

The dried spherules were then sintered by heating them in a furnace at a temperature of 750° C. for 6 hours. The spherules were air classified, and the fraction having a size of approximately 10 μm was subsequently isolated. The particles were all washed in sodium hydroxide (1.0 Molar), followed by water, nitric acid (1.0 Molar), water and then dried under vacuum at 110° C. BET nitrogen porosimetry was performed in order to further characterize the sintered spherules. The physical characteristics of the spherules were as listed below in Table 2.

TABLE 2

| | |
|---|---|
| Surface area (m^2/g) | 22.1 |
| Pore volume (mL/g) | 0.13 |
| Pore diameter (angstrom) | 240 |
| Internal Porosity | 0.44 |
| Average size (micron) | 10.23 |
| Size Standard Deviation (um) | 2.62 |
| D90/D10 (Size Distribution) | 1.82 |

Example 2

Formation of Sulfuric Acid Modified Zirconia Particles 250 mL of a 1.5M sulfuric acid solution was prepared by adding 36.75 g (19.97 mL) sulfuric acid to 230.03 mL of HPLC grade water in a 500 mL round bottom flask. 50 g of 10 μm bare zirconia prepared as described in Example 1 was put into the flask. The particle suspension was then sonicated under vacuum for approximately 10 minutes while swirling to fully suspend the particles. The flask was then attached to a water-cooled condenser and heating mantle. The solution was heated to a slow boil, and then refluxed for approximately 6 hours.

The heat source was then removed and the flask was allowed to cool down to room temperature. The particle suspension was then filtered on a medium fritted sintered glass funnel. The particles were then rinsed thoroughly with 4×200 mL of HPLC grade water and followed by 3×100 mL acetone. Air was then pulled through the particle cake for about 8 hours to dry the particles.

Example 3

Formation of Base Modified Zirconia Particles 1 liter of 2.0 M sodium hydroxide is placed in a 2 liter plastic Erlenmeyer flask. 110 g of 5 μm bare zirconia prepared as described in Example 1 was put into the flask. The particle suspension was sonicated for 10 minutes under vacuum and then swirled for 2 hours at ambient temperature. The particles were then allowed to settle and the base solution was decanted and then 1.4 liters of HPLC-grade water was added to the flask followed by settling decanting. Then 200 mL of HPLC-grade water was added back to the flask and the particles were collected on a nylon filter with 0.45 micron pores. The collected particles were then washed with 2 aliquots of 200 mL HPLC-grade water followed by 3 aliquots of 200 mL of HPLC-grade methanol. Air was then allowed to pass through the particles until they were free-flowing.

Example 4

Formation of a Packed Column

Particles as formed in Example 3 were slurried in ethanol (6.5 g zirconia in 24 mL of ethanol) and packed into a 15 cm×4.6 mm i.d. stainless steel HPLC column at 7,000 PSI using ethanol as a pusher solvent. The column was allowed to pack for 30 minutes under pressure and then the pressure was allowed to slowly bleed off and the end fitting and frit were attached to the inlet of the column.

Example 5

Batch Production of Alkyl Esters from Soybean Oil Using Sulfated Zirconia

Sulfuric acid modified zirconia (zirconium dioxide) particles as formed in Example 2 were added to a reaction mixture of soybean oil (9 g) and methanol (79 g). A heating device was used to keep the reaction mixture at approximately 100° C. The reaction was allowed to proceed for approximately 27 hours.

The resulting mixture of components was then analyzed using GC-FID on a HP 5890 gas chromatograph with an inlet temperature of 220° C., detector at 240° C., column temperature of 220° C., HP INNOWAX column (25 meter×0.32 mm), helium inlet pressure of 54 Kpa.

The methyl esters of the six free fatty acids that are found in biodiesel were used as standards. The standards used in Table 3 as follows:

TABLE 3

| ESTER STANDARD | ESTER CHEMICAL NAME |
|---|---|
| Ester 1 | methyl palmitate |
| Ester 2 | methyl stearate |
| Ester 3 | methyl cis-9-oleic ester |
| Ester 4 | methyl linoleate |
| Ester 5 | methyl linolenate |
| Ester 6 | methyl arachidate |

The test results are summarized in Table 4 below.

TABLE 4

| Esters Produced (grams) | | | | | | |
|---|---|---|---|---|---|---|
| Ester 1 | Ester 2 | Ester 3 | Ester 4 | Ester 5 | Ester 6 | Total |
| 0.0015 | 0.0001 | 0.0029 | 0.0042 | 0.0003 | Not Quantified | 0.009 |

It was estimated that the theoretical yield for the reaction would be approximately 8.413 grams of esters. Based on this estimate, the actual yield of 0.009 grams of esters was approximately 0.10% of the theoretical yield.

Example 6

Continuous Production of Alkyl Esters from Soybean Oil Using Sulfated Zirconia

Sulfuric acid modified zirconia (zirconium dioxide) particles as formed in Example 2 were packed into a stainless steel reactor (column). A heating device (Metalox Column Heater, ZirChrom Separations, Inc., Anoka, Minn.) was used to heat the stainless steel reactor. The heating device was set to a temperature of approximately 200° C. (though the temperature inside the reactor was less than this). A reaction mixture of hexane (carrier), soybean oil, and methanol were pumped into the column at a flow rate of 1.78 mL/min. Overall pressure of approximately 1000 psi was kept on the column and a back pressure regulator was used. The reaction conditions are summarized in Table 5.

TABLE 5

| Set | Soybean Oil (g) | MeOH (g) | Hexane (g) | Temp. ° C. | Residence Time (min) |
|---|---|---|---|---|---|
| 1 | 17 | 3.82 | 153 | 200 | 1 |

In this example and other examples herein, residence time was calculated based on mass moving at ambient temperature through the pumps. The effluent was then analyzed by using GC-FID as described above in Example 5. The test results are summarized in Table 6 below.

TABLE 6

| Esters Produced (grams) | | | | | | |
|---|---|---|---|---|---|---|
| Set | Ester 1 | Ester 2 | Ester 3 | Ester 4 | Ester 5 | Ester 6 | Total |
| 1 | 0.297 | 0.120 | 0.568 | 1.336 | 0.191 | Not Quantified | 2.51 |

It was estimated that the theoretical yield for the reaction would be approximately 16.1 grams of esters. Based on this estimate, the actual yield of 2.51 grams of esters was approximately 15.8% of the theoretical yield.

Example 7

Continuous Production of Alkyl Esters from Soybean Oil Using Acid Catalysis

Acid modified zirconia (zirconium dioxide) particles as formed in Example 2 were packed into a stainless steel reactor (column). A heating device (Metalox Column Heater, ZirChrom Separations, Inc., Anoka, Minn.) was used to heat the stainless steel reactor. The heating device was set to a temperature of approximately 200° C. (though the temperature inside the reactor was less than this). A reaction mixture of hexane (carrier), soybean oil, and methanol were pumped into the column at a flow rate of 0.06 mL/min. Overall pressure of approximately 800 psi was kept on the column and a backpressure regulator was used. The reaction conditions are summarized in Table 7.

TABLE 7

| Set | Soybean Oil (g) | MeOH (g) | Isopropanol (g) | Hexane (g) | Temp. ° C. | Residence Time (min) |
|---|---|---|---|---|---|---|
| 1 | 40 | 8.03 | 0.80 | 360 | 200 | 30 |

The effluent was then analyzed by using GC-FID as described above in Example 5. The test results are summarized in Table 8 below.

TABLE 8

| Esters Produced (grams) | | | | | | |
|---|---|---|---|---|---|---|
| Set | Ester 1 | Ester 2 | Ester 3 | Ester 4 | Ester 5 | Ester 6 | Total |
| 1 | 3.933 | 2.194 | 7.670 | 9.362 | 3.014 | Not Quantified | 26.17 |

It was estimated that the theoretical yield for the reaction would be approximately 37.4 grams of esters. Based on this estimate, the actual yield of 26.17 grams of esters was approximately 70.0% of the theoretical yield.

Example 8

Continuous Production of Alkyl Esters from Soybean Oil Using Base Catalysis

Base modified zirconia (zirconium dioxide) particles as formed in Example 3 were packed into a stainless steel reactor (column). A heating device (Metalox Column Heater, ZirChrom Separations, Inc., Anoka, Minn.) was used to heat the stainless steel reactor. The heating device was set to a temperature of approximately 200° C. (though the temperature inside the reactor was less than this). A reaction mixture of hexane (carrier), soybean oil, and methanol were pumped into the column at a flow rate of 0.06 mL/min. Overall pressure of approximately 800 psi was kept on the column and a back pressure regulator was used. The reaction conditions are summarized in Table 9.

TABLE 9

| Set | Soybean Oil (g) | MeOH (g) | Isopropanol (g) | Hexane (g) | Temp. ° C. | Residence Time (min) |
|---|---|---|---|---|---|---|
| 1 | 40 | 8.03 | 0.80 | 360 | 200 | 30 |

The effluent was then analyzed by using GC-FID as described above in Example 5. The test results are summarized in Table 10 below.

TABLE 10

| | Esters Produced (grams) | | | | | | |
|---|---|---|---|---|---|---|---|
| Set | Ester 1 | Ester 2 | Ester 3 | Ester 4 | Ester 5 | Ester 6 | Total |
| 1 | 3.729 | 1.474 | 7.788 | 17.637 | 1.686 | 0.288 | 32.60 |

It was estimated that the theoretical yield for the reaction would be approximately 37.4 grams of esters. Based on this estimate, the actual yield of 32.60 grams of esters was approximately 86.4% of the theoretical yield.

Example 9

Formation of Phosphoric Acid Modified Zirconia Particles 250 mL of a 6.8% phosphoric acid solution was prepared by adding 20 mL phosphoric acid to 230 mL of HPLC grade water in a 500 mL round bottom flask. 50 g of 5 µm bare zirconia prepared as described in Example 1 was put into the flask. The particle suspension was then sonicated under vacuum for approximately 10 minutes while swirling to fully suspend the particles. The flask was then attached to a water-cooled condenser and heating mantle. The solution was heated to a slow boil, and then refluxed for approximately 6 hours.

The heat source was then removed and the flask was allowed to cool down to room temperature. The particle suspension was then filtered on a medium fritted sintered glass funnel. The particles were then rinsed thoroughly with 3×200 mL of HPLC grade water. Air was then pulled through the particle cake for about 8 hours to dry the particles.

Example 10

Formation of a Packed Column of Phosphoric Acid Modified Zirconia Particles

Particles as formed in Example 9 were slurried in ethanol (6.4 g zirconia in 24.5 mL of methanol) and packed into a 15 cm×4.6 mm i.d. stainless steel HPLC column at 7,000 PSI using methanol as a pusher solvent. The column was allowed to pack for 30 minutes under pressure and then the pressure was allowed to slowly bleed off and the end fitting and frit were attached to the inlet of the column.

Example 11

Continuous Production of Alkyl Esters from Soybean Oil Using Phosphated Zirconia Phosphoric acid modified zirconia (zirconium dioxide) particles as formed in Example 9 were packed into a stainless steel reactor (column) as described in Example 10. A heating device (Metalox Column Heater, ZirChrom Separations, Inc., Anoka, Minn.) was used to heat the stainless steel reactor. The heating device was set to a temperature of approximately 200° C. (though the temperature inside the reactor was less than this). A reaction mixture of hexane (carrier), n-propanol, soybean oil, and methanol were pumped into the column at a flow rate of 0.06 mL/min. Overall pressure of approximately 1000 psi was kept on the column and a back pressure regulator was used. The reaction conditions are summarized in Table 11.

TABLE 11

| Set | Soybean Oil (g) | MeOH (g) | n-Propanol | Hexane (g) | Temp. ° C. | Residence Time (min) |
|---|---|---|---|---|---|---|
| 1 | 18 | 4.0 | 0.4 | 180 | 200 | 27.8 |

The effluent was then analyzed by using GC-FID as described above in Example 5. The test results are summarized in Table 12 below.

TABLE 12

| | Esters Produced (grams) | | | | | | |
|---|---|---|---|---|---|---|---|
| Set | Ester 1 | Ester 2 | Ester 3 | Ester 4 | Ester 5 | Ester 6 | Total |
| 1 | 1.740 | 0.751 | 4.147 | 9.092 | 1.148 | 0.000 | 16.88 |

Figure 5:
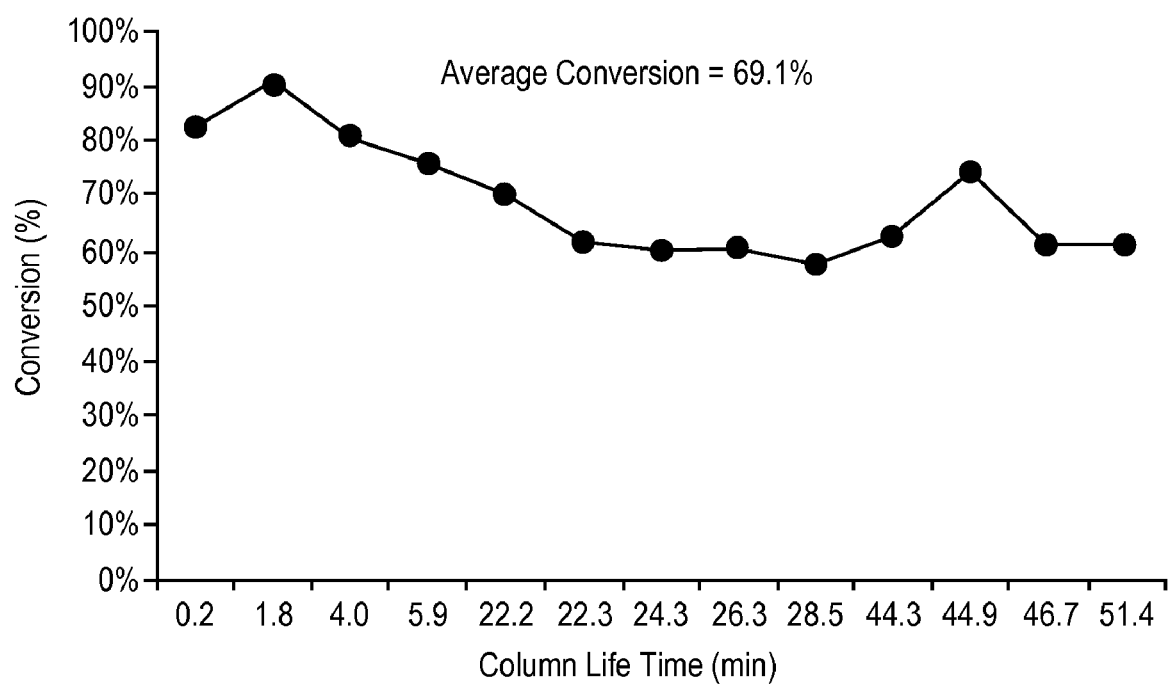
FIG. 5 is a graph showing the percent conversion of soybean oil to fatty acid methyl esters using a phosphated zirconia catalyst.

It was estimated that the theoretical yield for the reaction would be approximately 18.7 grams of esters. Based on this estimate, the actual yield of 16.88 grams of esters was approximately 90.3% of the theoretical yield. FIG. 5 shows the percent conversion over 51.4 hours of continuous operation. The average percent conversion over this time was 69.1%. The peak conversion was 90.3% and the conversion stabilized around 60% after an initial decrease was observed.

Example 12

Continuous Production of Alkyl Esters from Soybean Oil Using Phosphated Zirconia Catalyst A phosphated zirconia column was prepared according to the procedure described in Examples 9 and 10 and was placed in a block heater capable of reaching temperatures as high as 350° C.

Soybean oil (Sigma-Aldrich) was pumped from a reservoir with an HPLC pump and combined with HPLC-grade methanol that was pumped from a second HPLC pump with a stainless steel "T" that was immersed in silicone oil. The silicone oil was kept at a constant temperature and used to preheat the reactants before they entered the phosphated zirconia column. The phosphated zirconia column was temperature controlled using a fast-response resistive heating block hooked to a dual zone temperature controller. After the phosphated zirconia column, the stainless steel tubing passed through an ice bath to cool the effluent, which then passes through a back pressure regulator, and then to a collection vial.

Samples were formed using the reactor at the conditions describe below in Table 12. The fatty acid methyl ester content of each sample was then assessed using GC-FID as described in Example 5. The results of the GC-FID analysis are also shown below in Table 13.

TABLE 13

| Experiment # | Methanol Flow Rate (ml/min) | Oil Flow Rate (ml/min) | Actual Total Flow (ml/min) | Preheater Temp. (Celsius) | Reactor Temp. (Celsius) | Pressure (PSI) | Conversion (%) |
|---|---|---|---|---|---|---|---|
| 1 | 0.320 | 0.960 | 0.815 | 155 | 290 | 750 | 73.0% |
| 2 | 0.272 | 0.816 | 0.700 | 155 | 280 | 750 | 78.0% |
| 3 | 0.224 | 0.672 | 0.690 | 155 | 280 | 750 | 81.1% |
| 4 | 0.160 | 0.480 | 0.488 | 154 | 280 | 750 | 92.5% |
| 5 | 0.112 | 0.336 | 0.341 | 150 | 270 | 750 | 95.3% |

Figure 6:
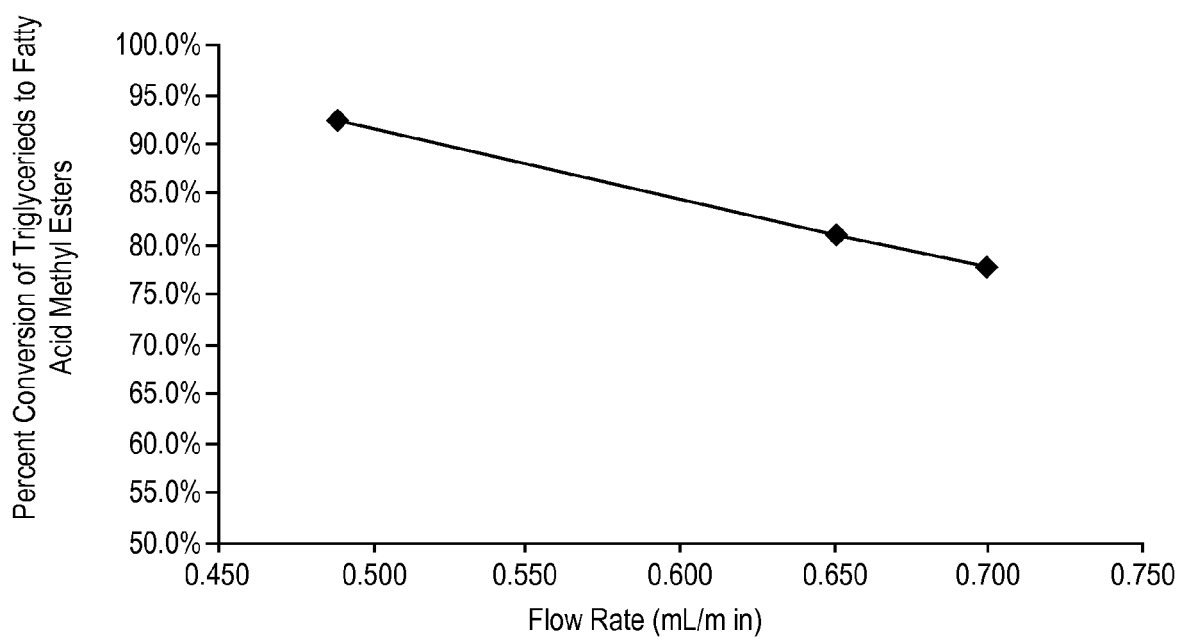
FIG. 6 is a graph showing the percent conversion of soybean oil to fatty acid methyl esters versus flow rate through a reactor.

It should be noted that the preheater temperature shown in Table 13 reflects the temperature of the silicone oil bath and the reactor temperature shown in Table 13 reflects the temperature of the heating block. Therefore, the actual temperature of the reactants would be somewhat less than these temperatures. It is notable that in this example pure feed stock components (e.g., only soybean oil and methanol) were used with no carrier (such as hexane) to lower the viscosity of the reactant mixture. The highest conversion percentage observed in these experiments was 95.3%. The percent conversion was calculated by assuming that 95% of the soybean oil is triglyceride and that there is a 1:1 mass ratio of triglyceride to biodiesel. Furthermore, there are 3 FAME molecules per 1 molecule of triglyceride. The total amount of FAME (measured as the mass sum of all six fatty acid methyl esters) in a sample aliquot was then quantified by GC-FID and then the percent conversion is extrapolated to the total sample size. FIG. 6 shows the percent conversion versus the flow rate, establishing that the flow rate has a direct effect on the conversion efficiency.

Example 13

Glycerol Analysis from Biodiesel Production

A byproduct of the transesterification reaction of soybean oil to fatty acid methyl esters includes glycerol. Glycerol is immiscible with the resulting fatty acid methyl esters and can be easily separated using a separatory funnel. Glycerol was separated from a fatty acid methyl ester composition produced with phosphated zirconia as described in Example 12. The glycerol was analyzed using NMR, confirming that glycerol is indeed produced in the reactor as expected. By integration of the NMR peaks, it was estimated that the glycerol produced using phosphated zirconia reactor is roughly 90% pure.

Example 14

Comparison of Phosphated Zirconia and Sulfated Zirconia

Samples of phosphated zirconia and sulfated zirconia were prepared in accordance with the procedures described above in Examples 9 and 2 respectively and then packed into columns. The physical characteristics of the phosphated zirconia and the sulfated zirconia are described in Table 14.

TABLE 14

|  | Particle size (microns) | Surface Area ($m^2/g$) | Pore Size (angstroms) |
|---|---|---|---|
| Phosphated Zirconia | 5.03 | 22.1 | 257 |
| Sulfated Zirconia | 10.2 | 22.1 | 240 |

A reactor was then set up similar to as in Example 12. Soybean oil (Sigma-Aldrich) was pumped from a reservoir with an HPLC pump and combined with HPLC-grade methanol that was pumped from a second HPLC pump with a stainless steel "T" that was immersed in silicone oil. The silicone oil was kept at a constant temperature and used to preheat the reactants before they entered either the zirconia column (phosphated or sulfated). The zirconia column was temperature controlled using a fast-response resistive heating block hooked to a dual zone temperature controller. After the zirconia column, the stainless steel tubing passed through an ice bath to cool the effluent, which then passes through a back pressure regulator, and then to a collection vial. The reaction was then run at the conditions described below in Table 15. The effluent from the columns was then collected and analyzed by GC-FID as described in Example 5. The results of the GC-FID analysis are shown below in Table 15 wherein FAME refers to fatty acid methyl esters.

TABLE 15

|  | Temperature (C.) | | Flow Rate (mL/min) | | Residence Time | FAME (g) | | Percent |
|---|---|---|---|---|---|---|---|---|
|  | Preheater | Column | Methanol | Oil | (min) | Measured | Theoretical | Conversion |
| Phosphated Zirconia | 180 | 290 | 0.224 | 0.672 | 1.86 | 2.09 | 2.43 | 85.9% |
| Sulfated Zirconia | 210 | 290 | 0.224 | 0.672 | 1.86 | 0.81 | 2.43 | 33.3% |

It should be noted that the preheater temperature shown in Table 15 reflects the temperature of the silicone oil bath and the column temperature shown in Table 15 reflects the temperature of the heating block. Therefore, the actual temperature of the reactants would be somewhat less than these temperatures. This example shows that phosphated zirconia works substantially better as a catalyst for converting triglycerides and methanol into fatty acid methyl esters (FAMEs) than otherwise similar sulfated zirconia.

Example 15

Effect of Reaction Temperature on Conversion Percentage

A sample of sulfated zirconia (average size of 10 microns) was prepared in accordance with the procedures described above in Example 2 and then packed into a column.

Figure 7:
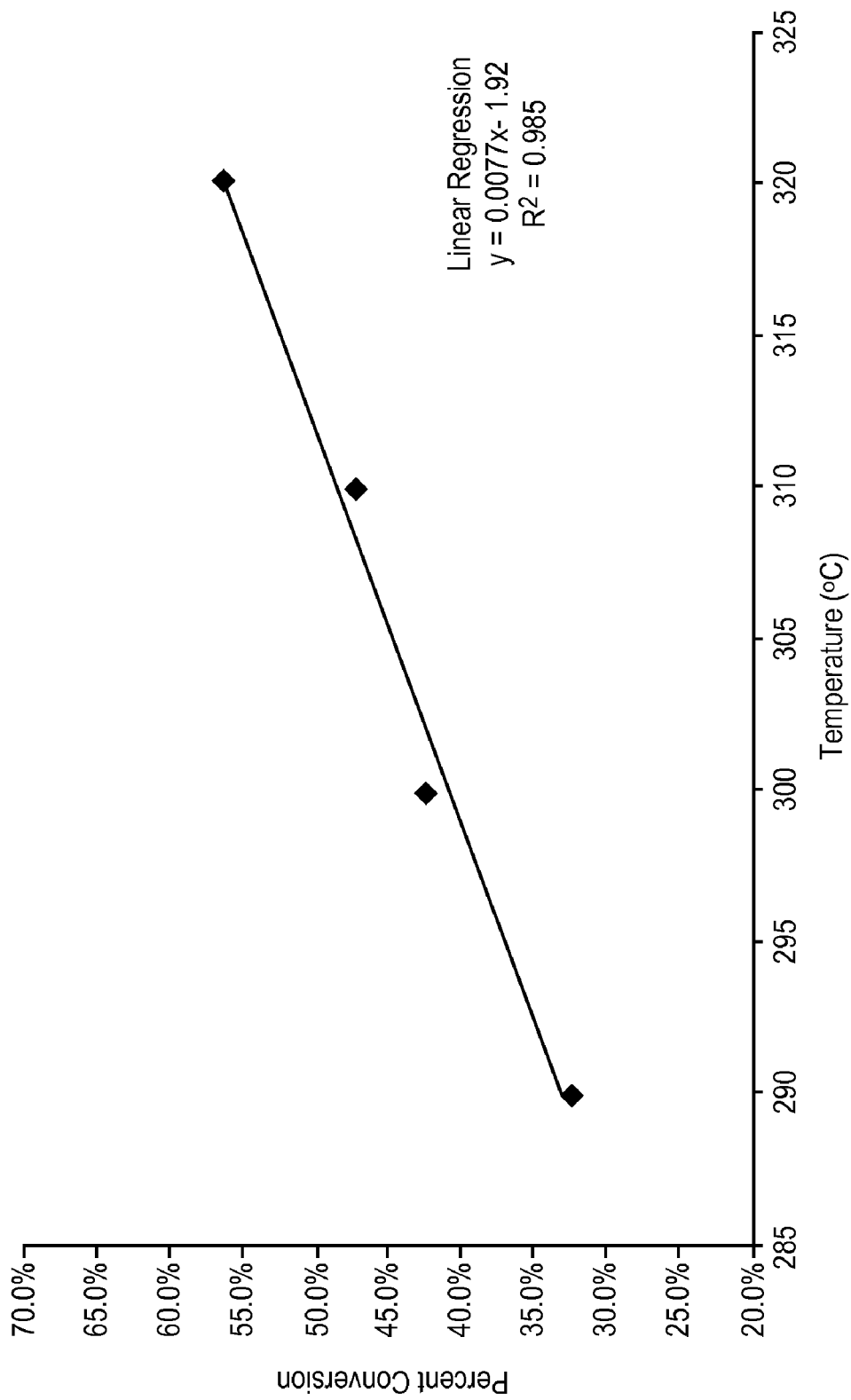
FIG. 7 is a graph showing the percent conversion of soybean oil to fatty acid methyl esters versus temperature.

A reactor was then set up similar to as in Example 12. Soybean oil (Sigma-Aldrich) was pumped from a reservoir with an HPLC pump and combined with HPLC-grade methanol that was pumped from a second HPLC pump with a stainless steel "T" that was immersed in silicone oil. The silicone oil was kept at a constant temperature and used to preheat the reactants before they entered either the sulfated zirconia column. The zirconia column was temperature controlled using a fast-response resistive heating block hooked to a dual zone temperature controller. Various temperatures for the zirconia column were used as shown below in Table 16. After the zirconia column, the stainless steel tubing passed through an ice bath to cool the effluent, which then passes through a back pressure regulator, and then to a collection vial. The reaction was then run at the conditions described below in Table 16. The effluent from the columns was then collected and analyzed by GC-FID as described in Example 5. The results of the GC-FID analysis are shown below in Table 16 wherein FAME refers to fatty acid methyl esters. The results of the GC-FID analysis are also shown in FIG. 7.

TABLE 16

| | Temperature (C.) | | Flow Rate (mL/min) | | Back Pressure | FAME (g) | Percent |
|---|---|---|---|---|---|---|---|
| | Preheater | Column | Methanol | Oil | (PSI) | (as measured) | Conversion |
| Sample 1 | 212 | 320 | 0.224 | 0.672 | 3500 | 0.05555 | 56.5% |
| Sample 2 | 210 | 310 | 0.224 | 0.672 | 1900 | 0.04663 | 47.4% |
| Sample 3 | 212 | 300 | 0.224 | 0.672 | 4200 | 0.04177 | 42.4% |
| Sample 4 | 209 | 290 | 0.224 | 0.672 | 1900 | 0.03176 | 32.3% |

This example shows that higher conversion rates can be achieved at higher temperatures. However, it should be noted that the preheater temperature shown in Table 16 reflects the temperature of the silicone oil bath and the reactor temperature shown in Table 16 reflects the temperature of the heating block. Therefore, the actual temperature of the reactants would be somewhat less than these temperatures.

Example 16

Continuous Production of Alkyl Esters from Soybean Oil Using Acid Modified Carbon Clad Zirconia Catalyst Zirconia particles with an average particle size of 5.03 μm were prepared as described in accord Example 1. 200 g of the zirconia particles were loaded into a rotating quartz tube reaction chamber and an organic bubbler was filled with HPLC-grade hexane. The entire system was flushed with nitrogen at ambient temperature using the following 5-step method: 1) flow nitrogen through reaction chamber and bubbler at 500 cc/min for 1 min, 2) flip open vent on bubbler to remove trapped air for a few seconds, 3) run nitrogen through bubbler bypass for 3 minutes, 4) shut off flow to auxiliary flow meter and run nitrogen through organic bubbler for 1 min, and 5) shut off flow to organic bubbler and run nitrogen through auxiliary flow meter for 45 min, pass nitrogen through the lines in one direction for 30 minutes and in the reverse direction for 15 min. After flushing with nitrogen, the temperature of the system was raised to 700° C. and nitrogen flow through the system was maintained. The quartz tube was then rotated at 1 revolution per minute. The heated zirconia was then equilibrated with nitrogen gas passing through the system at 500 cc/min. The line to the organic bubbler was then opened so that hexane vapor could pass into the reaction chamber and coating was performed for exactly 30 minutes. The line to the organic bubbler was then closed and the furnace was cooled as quickly as possible by opening the furnace top to a nitrogen flow at 100° C. After the furnace was cooled, the nitrogen flow was shut-off completely and the coated particles were removed and put into an extraction thimble. 100 mL of toluene was added to the thimble and the mixture was stirred with a TEFLON rod to wet particles. Next, Soxhlet extraction was performed with toluene for 12 hours. The particles were then filtered and collected on a sintered glass funnel. The particles were then washed with 200 mL of toluene, 150 mL of 1:1 ethanol:toluene, and 250 mL hexane. Finally, air was pulled through the cake until free flowing and then the particles were dried in a vacuum oven at 110° C. for roughly 12 hours. The resulting carbon clad zirconia had 1% carbon content by elemental analysis.

The carbon clad zirconia was then treated with phosphoric acid according the following procedure. 250 mL of a 6.8% phosphoric acid solution was prepared by adding 10 mL phosphoric acid to 115 mL of HPLC grade water in a 500 mL round bottom flask. 25 g of the 5.03 μm carbon clad zirconia described above was put into the flask. The particle suspension was then sonicated under vacuum for approximately 10 minutes while swirling to fully suspend the particles. The flask was then attached to a water-cooled condenser and heating mantle. The solution was heated to a slow boil, and then refluxed for approximately 6 hours.

The heat source was then removed and the flask was allowed to cool down to room temperature. The particle suspension was then filtered on a medium fritted sintered glass funnel. The particles were then rinsed thoroughly with 3×100 mL of HPLC grade water and 3×100 mL of HPLC grade ethanol. Air was then pulled through the particle cake for about 8 hours to dry the carbon clad zirconia particles.

The carbon clad zirconia particles were slurried in ethanol (6.0 g zirconia in 24.5 mL of chloroform) and packed into a 15 cm×4.6 mm i.d. stainless steel HPLC column at 11,000 PSI using pentane as a pusher solvent. The column was allowed to pack for 30 minutes under pressure and then the pressure was allowed to slowly bleed off and the end fitting and frit were attached to the inlet of the column.

Figure 8:
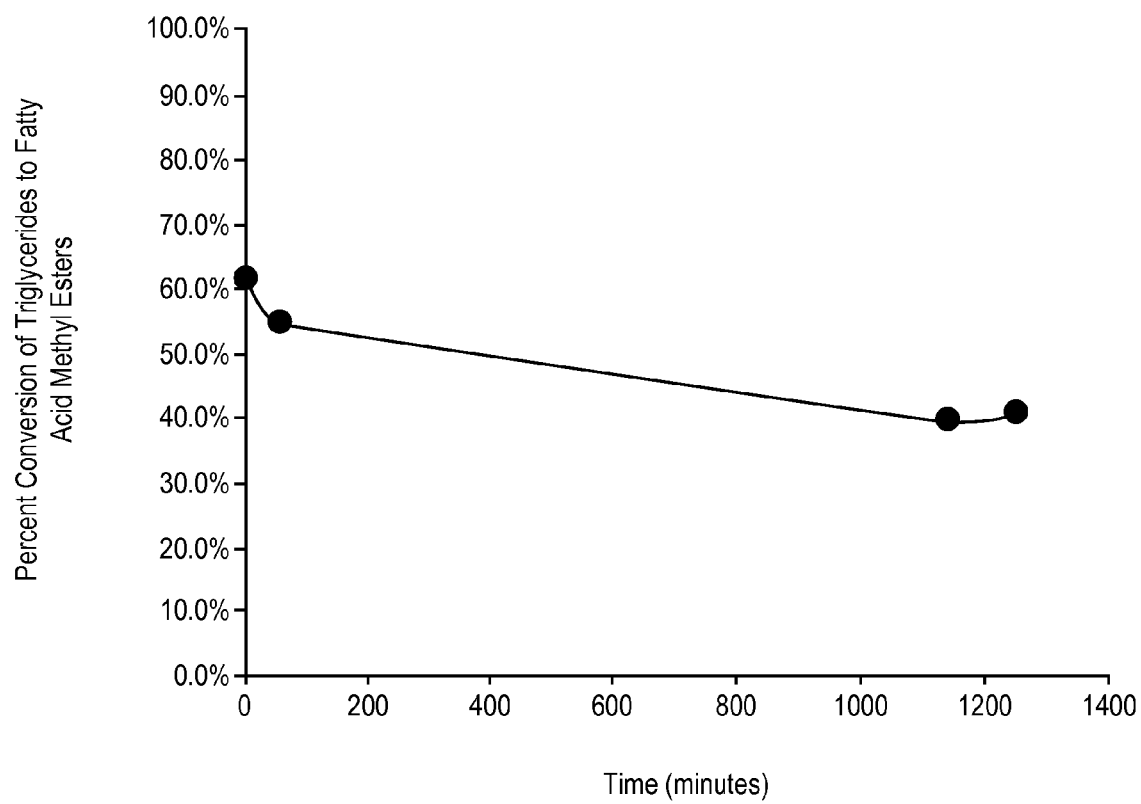
FIG. 8 is a graph showing the percent conversion of soybean oil to fatty acid methyl esters using carbon-clad zirconia.

A heating device (Metalox Column Heater, ZirChrom Separations, Inc., Anoka, Minn.) set at 200° C. was used to heat the packed column (the actual temperature of the reactants inside the column would be somewhat less than 200° C.). A reaction mixture of hexane, soybean oil, and methanol were pumped into the column at a flow rate of 0.06 mL/min. Overall pressure of approximately 800 psi was kept on the column and a back pressure regulator was used. The reaction products were then analyzed using gas chromatography as described in Example 5 above. The results are shown in FIG. 8. Under these conditions there was a slight drop in conversion rate and then it leveled off.

Example 17

Conversion of a Free Fatty Acid (Stearic Acid) to Alkyl Esters

A sample of phosphated zirconia (average size of 5 microns) was prepared in accordance with the procedures described above in Example 9 and then packed into a column.

Stearic acid (Sigma-Aldrich) was pumped from a reservoir with an HPLC pump and combined with HPLC-grade methanol that was pumped from a second HPLC pump with a stainless steel "T". The zirconia column was heated using a fast-response resistive heating block (set at 200 degrees Celsius) hooked to a dual zone temperature controller (the actual temperature of reactants inside the column was less than 200 degrees). After the zirconia column, the stainless steel tubing passed through an ice bath to cool the effluent, through a back pressure regulator, and then to a collection vial. The effluent was eluted off at a flow rate of 0.06 mL/min. The effluent from the columns was then collected and analyzed by GC-FID as described in Example 5. The results of the GC-FID analysis are shown below in Table 17.

TABLE 17

| Stearic Acid (g) | MeOH (g) | Flow Rate (mL/min) | Temperature (° C.) | Esterfication Time (min) | Conversion |
|---|---|---|---|---|---|
| 4.94 | 495.5 | 0.06 | 200 | 30 | 7.03% |

This example shows that acid-modified metal oxides, such as phosphated zirconia, can be used to convert free fatty acids into alkyl esters. While only 7.03% of the stearic acid was converted to alkyl esters under these reaction conditions, it will be appreciated that this is partially an effect of the temperature used and that it would be expected that the conversion rate would be higher at higher temperatures and/or longer residence times.

Example 18

Conversion of Yellow Grease to Alkyl Esters

A sample of phosphated zirconia (average size of 5 microns) was prepared in accordance with the procedures described above in Example 9 and then packed into a column.

A sample of yellow grease was obtained from Restaurant Technologies, Inc. (Eagan, Minn.) and observed to contain a substantial amount of particulate material. The yellow grease was prepared by first filtering it through a 10 micron "sock" filter, then filtering through a course paper filter (Whatman #1) and then finally through a 0.45 micron nylon filter.

A reactor was then set up similar to as in Example 12. The prepared yellow grease (Sigma-Aldrich) was pumped from a reservoir with an HPLC pump and combined with HPLC-grade methanol that was pumped from a second HPLC pump with a stainless steel "T" that was immersed in silicone oil. The silicone oil was kept at a constant temperature and used to preheat the reactants before they entered either the sulfated zirconia column. The zirconia column was temperature controlled using a fast-response resistive heating block hooked to a dual zone temperature controller. Various temperatures for the zirconia column were used as shown below in Table 18. After the zirconia column, the stainless steel tubing passed through an ice bath to cool the effluent, which then passes through a back pressure regulator (back pressure kept at 1600 psi), and then to a collection vial. The reaction was then run at the conditions described below in Table 18. It should be noted that the preheater temperature shown in Table 18 reflects the temperature of the silicone oil bath and the reactor temperature shown in Table 18 reflects the temperature of the heating block. Therefore, the actual temperature of the reactants would be somewhat less than these temperatures. The effluent from the columns was then collected and analyzed by GC-FID as described in Example 5. The results of the GC-FID analysis are shown below in Table 18 wherein FAME refers to fatty acid methyl esters.

TABLE 18

| Temperature (C.) | | Flow Rate (mL/min) | | FAME (g) | | |
|---|---|---|---|---|---|---|
| Pre-heater | Column | Methanol | Oil | Measured | Theoretical | Percent Conversion |
| 214 | 300 | 0.224 | 0.672 | 0.258 | 0.492 | 52.5% |
| 219 | 320 | 0.224 | 0.672 | 0.267 | 0.492 | 54.4% |

This example shows that embodiments of the invention can be used to convert triglycerides in yellow grease into fatty acid alkyl esters.

Example 19

Formation of Phosphoric Acid Modified Titania Particles 125 mL of a 6.8% phosphoric Acid solution was prepared by adding 10 mL phosphoric acid to 115 mL of HPLC grade water in a 250 mL round bottom flask. 25 g of 5 μm bare titania (Sachtleben, Germany) was added to the flask. Table 19 shows the physical characteristics of the porous titania particles.

TABLE 19

| Surface area (m^2/g) | 15.0 |
|---|---|
| Pore volume (mL/g) | 0.12 |
| Pore diameter (angstrom) | 300 |
| Internal Porosity | 0.32 |
| Average size (micron) | 5.0 |

The particle suspension was then shaken by hand under vacuum for approximately 20 minutes while swirling to fully suspend the particles. The flask was then attached to a water-cooled condenser and heating mantle. The solution was heated to a slow boil, and then refluxed for approximately 6 hours.

The heat source was then removed and the flask was allowed to cool down to room temperature. The particle suspension was then filtered on a medium fritted sintered glass funnel. The particles were then rinsed thoroughly with 3×100 mL of HPLC grade water. Air was then pulled through the particle cake for about 8 hours to dry the particles.

Example 20

Production of Fatty Acid Methyl Esters Using Phosphoric Acid Modified Titania Particles Acid modified titania (titanium dioxide) particles as formed in Example 20 were packed into a stainless steel reactor (column). A heating device (Metalox Column Heater, ZirChrom Separations, Inc., Anoka, Minn.) was used to heat the stainless steel reactor to a temperature of approximately 200° C. A reaction mixture of hexane, soybean oil, and methanol were pumped into the column at a flow rate of 0.06 mL/min. Overall pressure of approximately 1,000 psi was kept on the column and a back pressure regulator was used. The reaction conditions are summarized in Table 20.

TABLE 20

| Set | Soybean Oil (g) | MeOH (g) | n-Propanol | Hexane (g) | Temp. ° C. | Residence Time (min) |
|---|---|---|---|---|---|---|
| 1 | 20 | 4 | 0.4 | 180 | 200 | 28.3 |

The effluent was then analyzed by using GC-FID as described above in previous examples. The test results are summarized in Table 21 below.

TABLE 21

| | Esters Produced (grams) | | | | | | |
|---|---|---|---|---|---|---|---|
| Set | Ester 1 | Ester 2 | Ester 3 | Ester 4 | Ester 5 | Ester 6 | Total |
| 1 | 0.24 | 0.10 | 0.52 | 12.18 | 0.15 | 0.01 | 13.19 |

It was estimated that the theoretical yield for the reaction would be approximately 18.7 grams of esters. Based on this estimate, the actual yield of 13.2 grams of esters was approximately 70.5% of the theoretical yield.

Example 21

Conversion of Soybean Oil to Alkyl Esters Using Hydroxide Modified Titania Catalyst Titania particles were obtained (20 μm average diameter and 300 Angstrom average pore size) and then modified with sodium hydroxide according to the procedure described in Example 3 above. The resulting hydroxide modified titania particles were then packed into a stainless steel reactor (column) with dimensions of 150 mm in length and 4.6 mm in width.

A heat exchange system was used to both heat the reactants and cool the reaction products. A coil preheater was used to raise the temperature of reactants before entering the stainless steel reactor. The coil preheater included tubing wound around a grooved heater core with a resistive heater disposed in the middle of the core. A thermocouple was used to monitor the preheater core temperature. A column heater was used to regulate the temperature of the reactor. The column heater was a tube furnace heater.

Both the soybean oil and the methanol were sparged with nitrogen gas. A degasser was used on the methanol inlet. Soybean oil and methanol were separately pumped, at the flow rates indicated below, the flow streams were then joined and then passed into the stainless steel reactor. Pressure regulators were used to maintain pressure within the reactor as indicated below. The reaction conditions are summarized in Table 22.

TABLE 22

| | Flow Rates (mL/min) | | | Temperature (Celsius) | | Column Pressure (PSI) | |
|---|---|---|---|---|---|---|---|
| | | | | | Column | | |
| Sample | MeOH | Oil | Preheater | Inlet | Outlet | Front | Back |
| 1 | 0.96 | 0.72 | 405 | 356 | 354 | 3500 | 3450 |
| 2 | 0.96 | 0.72 | 395 | 353 | 354 | 2400 | 2500 |
| 3 | 2.496 | 1.872 | 376 | 348 | 356 | 2800 | 2750 |
| 4 | 2.496 | 1.872 | 382 | 350 | 351 | 3400 | 3300 |
| 5 | 2.496 | 1.872 | 438 | 404 | 402 | 3400 | 3350 |
| 6 | 2.496 | 1.872 | 438 | 404 | 403 | 3200 | 3150 |
| 7 | 5.056 | 3.792 | 427 | 401 | 401 | 3200 | 3000 |
| 8 | 5.056 | 3.792 | 428 | 401 | 401 | 3200 | 3000 |
| 9 | 5.056 | 3.792 | 490 | 449 | 442 | 3750 | 3050 |
| 10 | 5.056 | 3.792 | 490 | 449 | 442 | 3750 | 3050 |
| 11 | 5.056 | 3.792 | 490 | 449 | 442 | 3750 | 3050 |
| 12 | 5.056 | 3.792 | 493 | 451 | 454 | 3600 | 2000 |

The effluent was then analyzed by using 300 MHz $^1$H NMR. Further aspects of the reaction conditions, and the percent conversion as analyzed using NMR, are shown below in Table 23.

TABLE 23

| Sample | Molar Ratio MeOH:Oil | Residence Time (minutes) | FAME Conversion (% as per NMR) |
|---|---|---|---|
| 1 | 32.7:1 | 1.012 | 87.0 |
| 2 | 32.7:1 | 1.012 | 85.8 |
| 3 | 32.7:1 | 0.389 | 87.7 |
| 4 | 32.7:1 | 0.389 | 88.1 |
| 5 | 32.7:1 | 0.389 | 81.3 |
| 6 | 32.7:1 | 0.389 | 78.4 |
| 7 | 32.7:1 | 0.192 | 88.9 |
| 8 | 32.7:1 | 0.192 | 87.3 |
| 9 | 32.7:1 | 0.192 | 50.1 |
| 10 | 32.7:1 | 0.192 | 50.1 |
| 11 | 32.7:1 | 0.192 | 50.1 |
| 12 | 32.7:1 | 0.192 | 43.3 |

This example shows that base modified titania particles can be used in a continuous process for producing alkyl esters. This example also shows that exceeding a desirable reaction temperature while using a titania catalyst can result in a reduction in the conversion of the feed stock into fatty acid methyl esters. However, the use of titania can be advantageous because it is generally less expensive than some other metal oxides, such as zirconia.

Example 22

Formation of Polybutadiene Coated Phosphoric Acid Modified Zirconia Particles The zirconia particles formed as described in Example 1 were coated with polybutadiene (PBD) by the following method. 2.5 g PBD was added to a 500 mL round bottom flask. The volume was brought up to 75 ml w/HPLC grade hexane and the flask was swirled until PBD is fully dissolved. 45 g of bare zirconia was added to the 500 mL round bottom flask (A/B washed) and resulting slurry was sonicated for a few minutes under vacuum, breaking the vacuum periodically (about 5 min). 2.03 grams of a stock solution of dicumyl peroxide (DCP) was added (stock solution made by adding 0.25 g DCP into 8.25 g hexane). The slurry was sonicated under vacuum for 5 minutes, breaking vacuum every minute to allow infiltration of particle pores. The flask was rotated on a rotary station for 2 hours. A rotary evaporator was used to evaporate solvent at 55° C. with a vacuum of 14 in Hg over a period of 15 minutes. The material was allowed to continue to dry for 15 minutes at 55° C. under a vacuum of 14 in Hg.

Particles were transferred to a clean quartz tube and washed repeatedly with hexane. The quartz tube was placed in a rotating furnace and then connected a supply of ultra pure nitrogen and flushed for 30 min. The particles were dried at 110° C. for 1 hour, then the temperature was raised to 160° C. and the material cross-linked at 160° C. for 5 hrs, all while running ultra pure nitrogen through the tube.

Particles were transferred from the tube to a soxhlet extractor. 500 mL of toluene was used with the extractor for 8 hours. The particles were collected on a membrane filter and rinsed with 2×100 mL of ethanol. Air was pulled through the cake for three hours until the particles were dry. The particles were resuspended in 200 mL 50/50 0.2M NaOH/THF in a 1 liter Erlenmeyer flask. The material was then sonicated under vacuum for 5 minutes, breaking vacuum once every minute. The particles were filtered and then dried by pulling air through the cake for 1 hour. The washing step was repeated two more times. The particles were rinsed while on a filter with 2×100 mL HPLC ethanol, and then dried by pulling air through the cake for 3 hours.

10 g of the resulting 5 µm PBD coated zirconia particles were put into in a 250 mL round bottom flask. The particles were suspended in 10 mL of ethanol. 125 mL of a 6.8% phosphoric acid solution prepared by adding 10 mL phosphoric acid to 115 mL of HPLC grade water was added to the flask. The particles were sonicated under vacuum for approximately 20 minutes while swirling to fully suspend the particles. The flask was then attached to a water-cooled condenser and heating mantle. The solution was heated to a slow boil, and then refluxed for approximately 3 hours.

The heat source was then removed and the flask was allowed to cool down to room temperature. The particle suspension was then filtered on a medium fritted sintered glass funnel. The particles were then rinsed thoroughly with 3×100 mL of HPLC grade water and then washed with 3×100 mL of ethanol. The particles were then dried under vacuum for 2 hours.

Example 23

Production of Fatty Acid Methyl Esters Using Acid Modified Polybutadiene Coated Zirconia Particles Acid modified PBD coated zirconia (zirconium dioxide) particles as formed in Example 23 were packed into a stainless steel reactor (column). A heating device (Metalox Column Heater, ZirChrom Separations, Inc., Anoka, Minn.) was used to heat the stainless steel reactor to a temperature of approximately 200° C. A reaction mixture of hexane, soybean oil, and methanol were pumped into the column at a flow rate of 0.06 mL/min. Overall pressure of approximately 1,000 psi was kept on the column and a back pressure regulator was used. The reaction conditions are summarized in Table 24.

TABLE 24

| Set | Soybean Oil (g) | MeOH (g) | n-Propanol | Hexane (g) | Temp. ° C. | Residence Time (min) |
|---|---|---|---|---|---|---|
| 1 | 20 | 4 | 0.4 | 180 | 200 | 28.3 |

The effluent was then analyzed by using GC-FID as described above in Example 5. The test results are summarized in Table 25 below.

TABLE 25

| | Esters Produced (grams) | | | | | | |
|---|---|---|---|---|---|---|---|
| Set | Ester 1 | Ester 2 | Ester 3 | Ester 4 | Ester 5 | Ester 6 | Total |
| 1 | 1.739 | 0.719 | 3.951 | 8.775 | 1.353 | 0.575 | 17.1 |

It was estimated that the theoretical yield for the reaction would be approximately 18.7 grams of esters. Based on this estimate, the actual yield of 17.1 grams of esters was approximately 88.4% of the theoretical yield.

Example 24

Conversion of Soybean Oil to Alkyl Esters Using Hydroxide Modified Zirconia Catalyst Phosphoric Acid Modified Zirconia Catalyst and Control Zirconia particles were obtained (25 µm average diameter and 300 Angstrom average pore size) and then modified with sodium hydroxide according to the procedure described in Example 3 above to form a first catalyst ("BMZ"). Zirconia particles were obtained (25 µm average diameter and 300 Angstrom average pore size) and then modified with phosphoric acid according to the procedure described in Example 9 above to form a second catalyst ("PMZ"). Titania particles were obtained (20 µm average diameter and 300 Angstrom average pore size) and then modified with sodium hydroxide according to the procedure described in Example 3 above to form a third catalyst ("PMT"). A fourth catalyst consisted of unmodified zirconia (25 µm average diameter and 300 Angstrom average pore size). A fifth catalyst consisted of unmodified alumina particles. The catalyst particles were then packed into a stainless steel reactor (columns) with dimensions of 150 mm in length and 4.6 mm in width.

A heat exchange system was used to both heat the reactants and cool the reaction products. A coil preheater was used to raise the temperature of reactants before entering the stainless steel reactor. The coil preheater included tubing wound around a grooved heater core with a resistive heater disposed in the middle of the core. A thermocouple was used to monitor the preheater core temperature. A column heater was used to regulate the temperature of the reactor. The column heater was a tube furnace heater.

A degasser was used on the methanol inlet. A feed stock oil (as shown in Table 27) and methanol were separately pumped, at the flow rates indicated below, the flow streams were then joined and then passed into the stainless steel reactor. Pressure regulators were used to maintain pressure within the reactor as indicated below. The reaction conditions are summarized in Table 26.

TABLE 26

| | Flow Rates (mL/min) | | Temperature (Celsius) | | | Column Pressure (PSI) | |
|---|---|---|---|---|---|---|---|
| | | | | Column | | | |
| Sample | MeOH | Oil | Preheater | Inlet | Outlet | Front | Back |
| 1 | 10.176 | 7.632 | 444 | 450 | 455 | 2200 | 2050 |
| 2 | 10.176 | 7.632 | 463 | 466 | 465 | 2900 | 2600 |
| 3 | 0.960 | 0.720 | 414 | 354 | 356 | 2200 | 2500 |
| 4 | 2.496 | 1.872 | 379 | 353 | 356 | 3000 | 2800 |
| 5 | 2.496 | 1.872 | 322 | 305 | 313 | 3200 | 3000 |
| 6 | 2.496 | 1.872 | 379 | 344 | 355 | 3400 | 3100 |
| 7 | 2.496 | 1.872 | 434 | 402 | 408 | 3200 | 3000 |
| 8 | 10.176 | 7.632 | 413 | 387 | 342 | 3175 | 2500 |
| 9 | 10.176 | 7.632 | 455 | 445 | 462 | 3050 | 2700 |

TABLE 26-continued

| | Flow Rates (mL/min) | | Temperature (Celsius) | | | Column Pressure (PSI) | |
|---|---|---|---|---|---|---|---|
| Sample | MeOH | Oil | Preheater | Inlet | Outlet | Front | Back |
| 10 | 9.088 | 6.249 | 377 | 355 | 366 | 3300 | 2500 |
| 11 | 9.088 | 6.816 | 357 | 348 | 340 | 3400 | 3150 |
| 12 | 9.088 | 6.816 | 355 | 362 | 352 | 3000 | 2700 |
| 13 | 9.088 | 6.249 | 355 | 355 | 375 | 2500 | 2500 |

The effluent was then analyzed by using 300 MHz $^1$H NMR. Further aspects of the reaction conditions, and the percent conversion as calculated using 300 MHz $^1$H NMR, are shown below in Table 27. A significant amount of gas was evolved during some of the reactions. A sample of this gas was evaluated using near infrared spectroscopy (NIR) and found to include dimethyl ether, methane, carbon monoxide, and carbon dioxide.

TABLE 27

| Sample | Catalyst | Oil or Tallow Type | Molar Ratio MeOH:Oil | Residence Time (seconds) | FAME Conversion (% as per NMR) |
|---|---|---|---|---|---|
| 1 | BMZ | Soybean Oil | 32.7 | 5.9 | 92.6 |
| 2 | BMZ | Used Soybean Oil | 32.7 | 5.9 | 92.6 |
| 3 | BMZ | Used Soybean Oil | 32.7 | 60.7 | 90.5 |
| 4 | BMZ | Soybean Oil | 32.7 | 23.4 | 79.4 |
| 5 | BMZ | Soybean Oil | 32.7 | 23.4 | 15.5 |
| 6 | BMZ | Used Soybean Oil | 32.7 | 23.4 | 86.2 |
| 7 | BMZ | Soybean Oil | 32.7 | 23.4 | 87.3 |
| 8 | PMZ | Soybean Oil | 32.7 | 5.9 | 92.2 |
| 9 | None (Control) | Soybean Oil | 32.7 | 8.4 | 14.1 |
| 10 | Unmodified Zirconia | Soybean Oil | 34.5 | 59 | 91.3 |
| 11 | BMT | Swine Tallow | 32.7 | 56.9 | 90.5 |
| 12 | BMT | Corn Oil | 32.7 | 56.9 | 89.0 |
| 13 | Unmodified Alumina | Soybean Oil | 34.5 | 59.0 | 88.1 |

Figure 9:
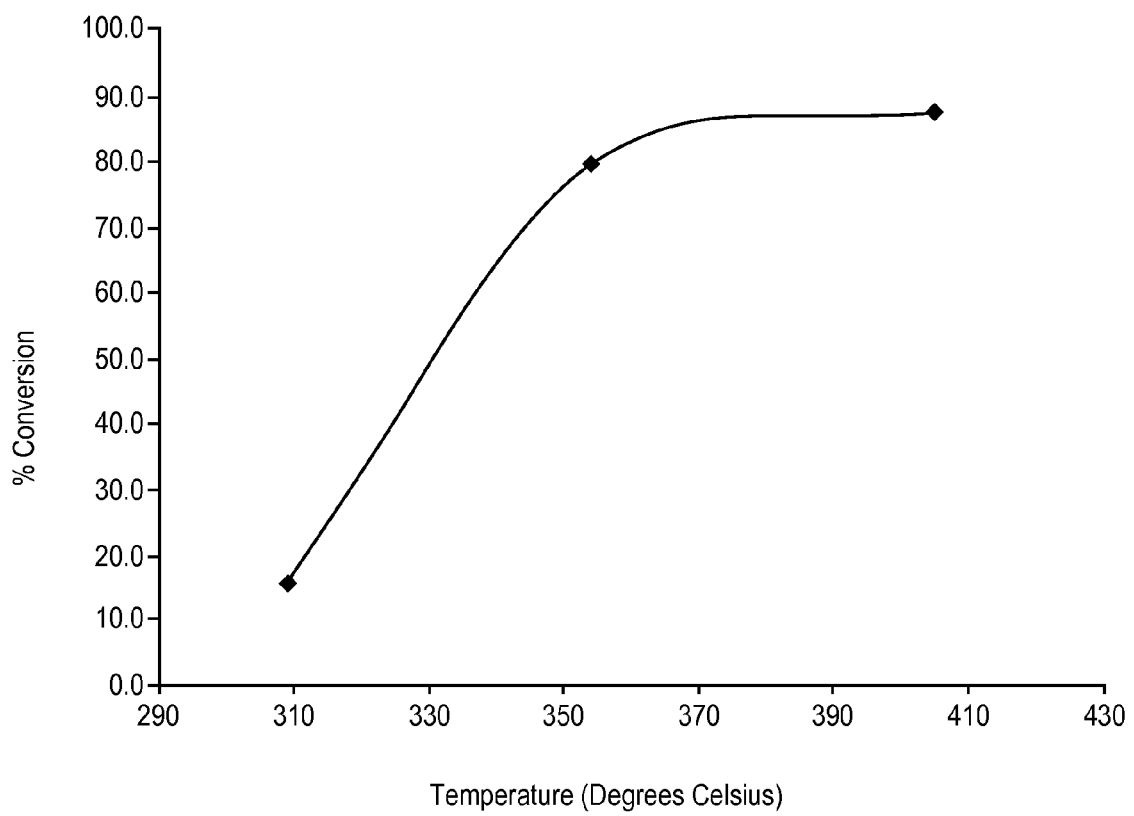
FIG. 9 is a graph showing the percent conversion of soybean oil to fatty acid methyl esters versus temperature for selected samples from Example 24.

FIG. 9 shows the effect of average reactor temperature ((inlet temperature+outlet temperature)/2) on conversion percentage. Specifically, FIG. 9 shows the conversion percentages for sample 4 (354.5° C.), sample 5 (309° C.), and sample 7 (405° C.).

This example shows that very low residence times (5.9 seconds) can be achieved using supercritical conditions and metal oxide catalysts as described herein. This example further shows that unmodified metal oxides catalysts can be used to achieve high conversion rates when using supercritical conditions. The swine tallow used in sample 11 was determined to have an acid number of 5.11. As such, this example further shows that methods and catalysts of the invention can be used to convert low value feed stocks having relatively high free fatty acid content (high acid number) into biodiesel fuel at a high percent conversion.

Example 25

Conversion of Stearic Acid to Esters Using Hydroxide Modified Zirconia Catalyst

Zirconia particles were obtained (25 μm average diameter and 300 Angstrom average pore size) and then modified with sodium hydroxide according to the procedure described in Example 3 above. The resulting hydroxide modified zirconia particles were then packed into a stainless steel reactor (column) with dimensions of 150 mm in length and 4.6 mm in width.

A heat exchange system was used to both heat the reactants and cool the reaction products. A coil preheater was used to raise the temperature of reactants before entering the stainless steel reactor. The coil preheater included tubing wound around a grooved heater core with a resistive heater disposed in the middle of the core. A thermocouple was used to monitor the preheater core temperature. A column heater was used to regulate the temperature of the reactor. The column heater was a tube furnace heater.

Stearic acid (SA) was mixed with butanol to form a 10% SA solution. Both the 10% SA solution and the methanol were sparged with nitrogen gas. A degasser was used on the methanol inlet. The 10% SA solution and the methanol were separately pumped, at the flow rates indicated below, the flow streams were then joined and then passed into the stainless steel reactor. Pressure regulators were used to maintain pressure within the reactor as indicated below. The reaction conditions are summarized in Table 28.

TABLE 28

| | Flow Rates (mL/min) | | | Temperature (Celsius) | | | Column Pressure (PSI) | |
|---|---|---|---|---|---|---|---|---|
| Sample | MeOH | SA/Butanol | Preheater | Inlet | Outlet | Front | Back | |
| 1 | 2.0 | 5.6 | 421 | 432 | 440 | 3300 | 2450 | |

The effluent was then analyzed by using 300 MHz $^1$H NMR. Further aspects of the reaction conditions, and the percent conversion as analyzed using NMR, are shown below in Table 29.

TABLE 29

| Sample | Molar Ratio MeOH:SA | Residence Time (minutes) | Conversion (% as per NMR) |
|---|---|---|---|
| 1 | 8.7:1 | 0.328 | 90.0 |

This example shows that base modified zirconia particles can be used in a continuous process for producing esters from free fatty acids.

Example 26

Hydroxide Modified Titania Catalyst Activity Over Time

Titania particles were obtained (80 μm average diameter and 60 Angstrom average pore size) and then modified with sodium hydroxide according to the procedure described in Example 3 above. The resulting hydroxide modified titania particles were then packed into a first and second stainless steel reactor (column) with dimensions of 150 mm in length and 4.6 mm in width each.

A heat exchange system was used to both heat the reactants and cool the reaction products. A coil preheater was used to raise the temperature of reactants before entering the first stainless steel reactor. The coil preheater included tubing wound around a grooved heater core with a resistive heater disposed in the middle of the core. A thermocouple was used to monitor the preheater core temperature. Column heaters were used to regulate the temperature of the reactors.

Figure 10A:
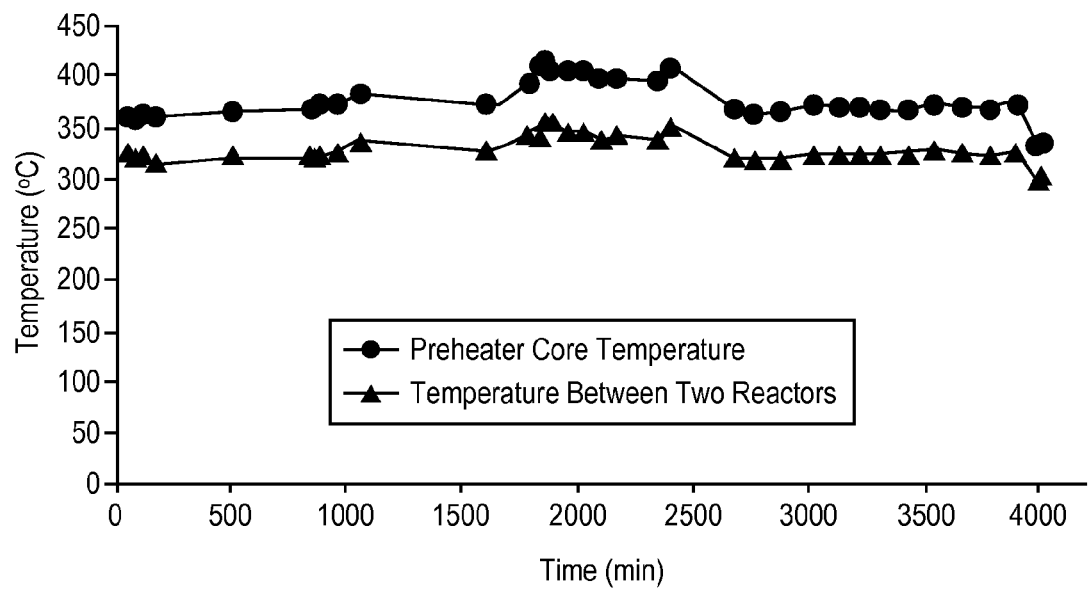
FIGS. 10A and 10B are graphs showing the reaction temperature over time and the conversion percentage over time for Example 26.

Both the soybean oil and the methanol were sparged with nitrogen gas. A degasser was used on the methanol inlet. The first and second reactors were arranged in series. Soybean oil and methanol were pumped into the first stainless steel reactor and then into the second stainless steel reactor. FIG. 10A shows the preheater core temperature and the temperature of the reaction mixture as measured between the two reactors.

Figure 10B:
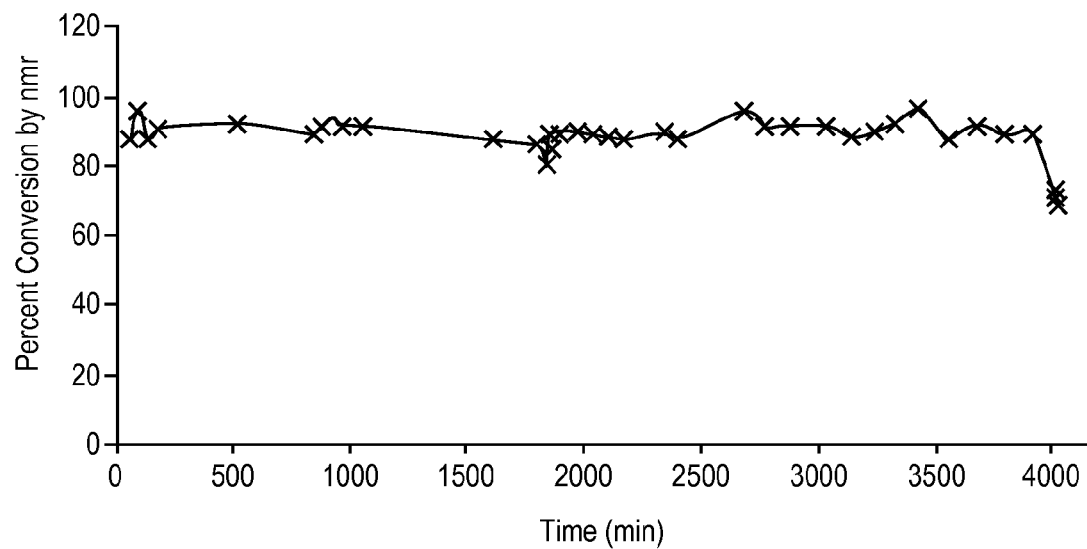

The effluent was then analyzed by using 300 MHz $^1$H NMR to calculate percent conversion. FIG. 10B shows the percent conversion over time as measured using NMR.

This example shows that catalysts of the invention can be used to convert feed stocks into fatty acid alkyl esters at a high percentage yield over an extended period of time. As such, this example shows that catalysts of the invention are resistant to catalyst poisoning.

The invention has been described with reference to various specific and preferred embodiments and techniques. However, it should be understood that many variations and modifications may be made while remaining within the spirit and scope of the invention. While reference is made to the production of biodiesel fuel, it will be appreciated the production of esters has significant commercial application outside the context of fuel production. As such, the invention can also include embodiments directed to the production of esters via esterification and transesterification reactions in other many other contexts.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference. Nothing herein is to be construed as an admission that the inventors are not entitled to antedate any publication and/or patent, including any publication and/or patent cited herein.

The claims are:

1. A process for producing alkyl esters comprising:
   mixing a lipid feed stock with an alcohol to form a reaction mixture;
   contacting the reaction mixture with a catalyst under supercritical pressure and temperature conditions for the alcohol to form reaction products, the catalyst consisting essentially of an unmodified metal oxide selected from the group consisting of alumina, titania, zirconia, and hafnia, and
   removing residual free fatty acids from the reaction products.

2. The process of claim 1, the catalyst consisting essentially of titania.

3. The process of claim 1, wherein the step of contacting the reaction mixture with a catalyst is performed at a temperature of between about 350 and 400 degrees Celsius.

4. The process of claim 1, wherein the step of contacting the reaction mixture with a catalyst is performed at a pressure of between about 1500 and 5000 psi.

5. The process of claim 1, wherein contacting the reaction mixture with a catalyst is performed with a residence time of less than about 60 seconds.

6. The process of claim 1, wherein contacting the reaction mixture with a catalyst converts at least about 80% of triglycerides from the lipid feed stock into fatty acid alkyl esters as measured by NMR.

7. The process of claim 1, wherein removing residual free fatty acids from the reaction products comprises adding dimethyl carbonate to the reaction mixture.

8. The process of claim 1, wherein removing residual free fatty acids from the reaction products comprises adsorbing the free fatty acids to a metal oxide substrate and separating the reaction mixture from the metal oxide substrate.

9. The process of claim 1, the catalyst comprising particles with an average particle size of about 0.2 microns to about 2 millimeters.

10. The process of claim 1, wherein the catalyst has a porosity of between about 0.3 and 0.6.

11. The process of claim 1, wherein the catalyst has a pore volume of between about 0 and 0.6 mls/gram.

12. The process of claim 1, wherein the particulate metal oxide has a surface area of between about 1 and 200 m$^2$/gram.

13. The process of claim 1, the alcohol comprising a C1-C6 alcohol.

14. The process of claim 1, further comprising adding a scent precursor compound comprising at least one carboxylic acid group to the reaction mixture before contacting the reaction mixture with a catalyst under supercritical conditions for the alcohol.

15. The process of claim 1, the lipid feed stock including a component selected from the group consisting of acidulated soapstock, tall oil, rapeseed oil, soybean oil, canola oil, cottonseed oil, grape seed oil, mustard seed oil, corn oil, linseed oil, sunflower oil, poppy-seed oil, walnut oil, peanut oil, rice bran oil, camellia oil, castor oil, and olive oil, palm kernel oil, coconut oil, rice oil, algae oil, seaweed oil, Chinese Tallow tree oil, yellow grease, choice white grease, lard, tallow, brown grease, fish oil and poultry fat.

16. The process of claim 1, the lipid feed stock having an acid number of greater than or equal to about 3 mg KOH/g oil.

17. A process for producing alkyl esters comprising:
   mixing a lipid feed stock with an alcohol to form a reaction mixture;
   contacting the reaction mixture with a catalyst under supercritical pressure and temperature conditions for the alcohol to form reaction products, the catalyst consisting essentially of a metal oxide selected from the group consisting of alumina, titania, zirconia, and hafnia, wherein the metal oxide has been treated with a Brønsted acid or a Brønsted base, and removing residual free fatty acids from the reaction products.

18. The process of claim 17, wherein the metal oxide has been treated with a Brønsted acid selected from the group consisting of hydrobromic acid, hydrochloric acid, hydroiodic acid, nitric acid, sulfuric acid, perchloric acid, boric acid, chloric acid, phosphoric acid, pyrophosphoric acid, methanethiol, chromic acid, permanganic acid, phytic acid and ethylenediamine tetramethyl phosphonic acid (EDTPA).

19. The process of claim 17, wherein the metal oxide has been treated with sulfuric acid.

20. The process of claim 17, wherein the metal oxide has been treated with phosphoric acid.

21. The process of claim 17, wherein the metal oxide has been treated with a Brønsted base selected from the group consisting of consisting of sodium hydroxide and potassium hydroxide and lithium hydroxide.

22. A process for producing alkyl esters via transesterification or esterification from a feed stock comprising:
    mixing the feed stock with an alcohol to form a reaction mixture, the feed stock comprising a triglyceride and/or a carboxylic acid; and
    pumping the reaction mixture into a housing comprising a porous catalyst, the porous catalyst comprising an average particle size of about 1 μm to about 100 μm, the temperature and pressure within the housing comprising supercritical pressure and temperature conditions for the alcohol, the porous catalyst comprising an unmodified metal oxide selected from the group consisting of alumina, titania, zirconia, and hafnia and
    collecting a reaction product from the housing, the reaction product comprising esters in an amount at least equal to 80% of the triglyceride or carboxylic acid in the feed stock on a molar basis.

23. The process of claim 16, the lipid feed stock having an acid number of greater than or equal to about 10 mg KOH/g oil.

24. A process for producing alkyl esters comprising:
    mixing a lipid feed stock with an alcohol to form a reaction mixture;
    contacting the reaction mixture with a catalyst under supercritical pressure and temperature conditions for the alcohol to form reaction products, the catalyst comprising an unmodified metal oxide selected from the group consisting of alumina, titania, zirconia, and hafnia, wherein contacting the reaction mixture with a catalyst is performed with a residence time of less than about 60 seconds, and
    removing residual free fatty acids from the reaction products.

* * * * *

UNITED STATES PATENT AND TRADEMARK OFFICE
CERTIFICATE OF CORRECTION

| | | |
|---|---|---|
| PATENT NO. | : 7,897,798 B2 | |
| APPLICATION NO. | : 11/833839 | |
| DATED | : March 1, 2011 | |
| INVENTOR(S) | : Clayton V. McNeff et al. | |

It is certified that error appears in the above-identified patent and that said Letters Patent is hereby corrected as shown below:

Col. 37, Line 17:   "consisting of consisting of" should read --consisting of--

Signed and Sealed this
Tenth Day of May, 2011

David J. Kappos
*Director of the United States Patent and Trademark Office*